United States Patent
Yamane et al.

(10) Patent No.: US 10,510,241 B2
(45) Date of Patent: Dec. 17, 2019

(54) COMMUNICATION APPARATUS AND DATA PROCESSING METHOD

(71) Applicant: SONY CORPORATION, Tokyo (JP)

(72) Inventors: Taketoshi Yamane, Kanagawa (JP); Naohisa Kitazato, Tokyo (JP); Jun Kitahara, Shizuoka (JP); Yasuaki Yamagishi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/754,673

(22) PCT Filed: Aug. 19, 2016

(86) PCT No.: PCT/JP2016/074206
§ 371 (c)(1),
(2) Date: Feb. 23, 2018

(87) PCT Pub. No.: WO2017/038494
PCT Pub. Date: Mar. 9, 2017

(65) Prior Publication Data
US 2018/0247520 A1    Aug. 30, 2018

(30) Foreign Application Priority Data

Sep. 3, 2015   (JP) .................................. 2015-174118

(51) Int. Cl.
*G08B 29/12*     (2006.01)
*G06F 13/00*    (2006.01)
(Continued)

(52) U.S. Cl.
CPC ........... *G08B 29/12* (2013.01); *G06Q 50/265* (2013.01); *G08B 21/02* (2013.01)

(58) Field of Classification Search
CPC ........ G08B 29/12; G08B 21/02; G08B 27/00; G06F 13/00; G06Q 50/265; H04M 11/00;
(Continued)

(56) References Cited

U.S. PATENT DOCUMENTS 5,400,246 A * 3/1995 Wilson .................... G06F 3/023
340/12.53
2010/0186030 A1    7/2010 Yun et al.

FOREIGN PATENT DOCUMENTS

| JP | 2005-236913 A | 9/2005 |
| JP | 2005-311810 A | 11/2005 |

(Continued)

OTHER PUBLICATIONS

International Search Report dated Nov. 22, 2016 in PCT/JP2016/074206 filed Aug. 19, 2016.
(Continued)

*Primary Examiner* — Daryl C Pope
(74) *Attorney, Agent, or Firm* — Oblon, McClelland, Maier & Neustadt, L.L.P.

(57) ABSTRACT

Provided is a configuration that permits confirmation of emergency information viewing results on a reception apparatus, an endpoint of emergency information such as TV. A data processing section of a reception apparatus such as TV that receives and outputs emergency information generates an emergency information viewing result report that contains a record of emergency information viewing result information and sends the generated emergency information viewing result report to a management server and so on. The data processing section generates an emergency information viewing result report that contains a record of an identifier of emergency information output by the reception apparatus and emergency information output time information in accordance with a CDM (Consumption Data Message) format. The CDM keeps a record of not only emergency (Continued)

information output time information but also reception apparatus position information, emergency information sender information, and so on.

20 Claims, 14 Drawing Sheets

(51) Int. Cl.

| | | |
|---|---|---|
| *G08B 27/00* | (2006.01) | |
| *H04M 11/00* | (2006.01) | |
| *H04M 11/04* | (2006.01) | |
| *H04N 17/00* | (2006.01) | |
| *H04N 21/442* | (2011.01) | |
| *H04N 21/658* | (2011.01) | |
| *G06Q 50/26* | (2012.01) | |
| *G08B 21/02* | (2006.01) | |

(58) Field of Classification Search
CPC ..... H04M 11/04; H04N 17/00; H04N 21/442; H04N 21/658
USPC .......................................... 340/506, 514, 3.1
See application file for complete search history.

(56) References Cited

FOREIGN PATENT DOCUMENTS

| | | |
|---|---|---|
| JP | 2014-057227 A | 3/2014 |
| WO | WO 2015/081218 A1 | 6/2015 |

OTHER PUBLICATIONS

Extended European Search Report dated Jan. 30, 2019 in European Patent Application 16841526.3 citing documents AA, AO and AX-AY therein, 10 pages.

Zheng,G. et al., "Web Analytics Overview", Encyclopedia of Information Science and Technology, XP055545683, URL:https://www.researchgate.net/publicati on/272815693_Web_Analytics_Overview, Jan. 31, 2015, 14 Page.

"Study of ISO/IEC $2^{nd}$ PDTR 23009-3 $2^{nd}$ edition DASH Implementation Guidelines", 111. Geneva; No. N15223, Mar. 6, 2015, XP030021949, 62 pages.

\* cited by examiner

F I G. 5

| Element (or Attribute with @) | | | | Cardinality | Data Type | Description |
|---|---|---|---|---|---|---|
| CDM | | | | 1 | | Consumption Data Message |
| @protocolVersion | | | | 1 | hexBinary | Major Version of CDM protocol |
| AVChannel | | | | 1..N | | |
| @channelNum | | | | 1 | hexBinary | Virtual Channel number (VIEWED CHANNEL NUMBER) |
| @serviceType | | | | 1 | unsignedByte | e.g., Television. Audio only. Parameterized |
| ViewInterval | | | | 1..N | | Virtual channel viewing interval |
| @startTime | | | | 1 | dateTime | Start time of interval (VIEWING START TIME) |
| @endTime | | | | 1 | dateTime | End time of interval (VIEWING END TIME) |
| @usageType | | | | 1 | int | Full screen, PIP, etc. |
| @viewStartTime | | | | 0..1 | dateTime | Start time of interval |
| @startTime | | | | 1 | dateTime | Start time of interval |
| @endTime | | | | 1 | dateTime | End time of interval |
| NRTItem | | | | 0..N | | Content item usage interval |
| @contentItemId | | | | 1 | string | Content item content linkage |
| @startTime | | | | 1 | dateTime | Start time of interval |
| @endTime | | | | 1 | dateTime | End time of interval |

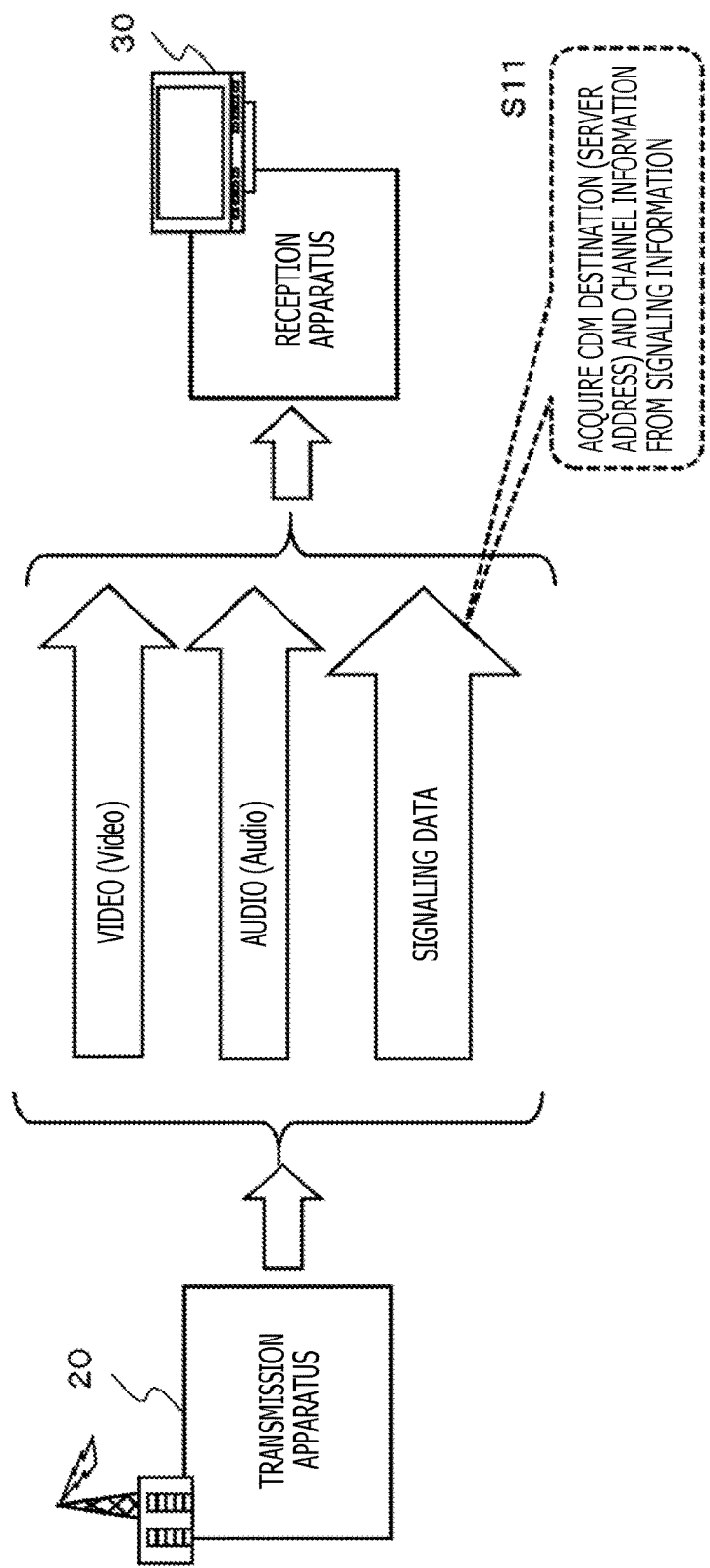

FIG. 7

| Element (or Attribute with @) | Cardinality | Data Type | Description |
|---|---|---|---|
| CDM | 1 | | Consumption Data Message |
| @protocolVersion | 1 | hexBinary | Major & minor Version of CDM protocol |
| @DeviceCategory | 1 | int | 1: Fixed device(TV), 2: Mobile, 3: Handheld, 4~: reserved |
| EmergencyAlert | 0..N | | |
| @MessageID | 1 | String | The identifier of the alert message (assigned by sender) |
| @SenderID | 1 | String | The identifier of the sender of the alert message |
| EAInterval | 1..N | | |
| @startTime | 1 | dateTime | Start time of interval |
| @endTime | 1 | dateTime | End time of interval |
| Location | 0..1 | String | Receiver's Location Information |
| @type | 1 | int | Types of code (1: Zip code, 2: LATITUDE\|LONGITUDE, 3: ANSI number codes(SS), 4~: reserved) |
| @status | 1 | string | Message Status ("Actual", "Exercise", "System", "Test", "Draft") |
| @msgType | 1 | string | Message Type ("Alert", "Update", "Cancel", "Ack", "Error") |
| @scope | 1 | string | Message Scope ("Public", "Restricted", "Private") |
| info | 0..1 | | |
| @category | 1 | string | Event category ("Geo", "Met", "Safety", "Security", ... Etc.) |
| @event | 1 | string | The text denoting the type of the subject event of the alert message. (e.g. SEVERE THUNDERSTORM) |
| @urgency | 1 | string | "Immediate", "Expected", "Future", "Past", "Unknown" |
| @severity | 1 | string | "Extreme", "Severe", "Moderate", "Minor", "Unknown" |
| @certainty | 1 | string | "Observed", "Likely", "Possible", "Unlikely", "Unknown" |

FIG. 8

| Element (or Attribute with @) | Cardinality | Data Type | Description |
|---|---|---|---|
| CDM | | | Consumption Data Message |
| @protocolVersion | 1 | hexBinary | Major & minor Version of CDM protocol |
| @DeviceCategory | 1 | | 1: Fixed device(TV), 2: Mobile, 3: Handheld, 4~ : reserved |
| EmergencyAlert | | | |
| @MessageID | 0..N | | The identifier of the alert message (assigned by sender) |
| @SenderID | 1 | | The identifier of the sender of the alert message |
| EAinterval | | | |
| @startTime | 1 | | Start time of interval |
| @endTime | 1 | | End time of interval |
| Location | 0..1 | String | Receiver's Location Information |
| @type | | | Types of code (1: Zip code, 2: LATITUDE|LONGITUDE, 3: ANSI number codes(SS), 4~: reserved) |
| @status | 1 | string | Message Status ("Actual", "Exercise", "System", "Test", "Draft") |
| @msgType | | | "te", "Cancel", "Ack", "Error") |
| @scope | 1 | string | Message Scope ("Public", "Restricted", "Private") |
| info | 0..1 | | |
| @category | 1 | string | Event category ("Geo", "Met", "Safety", "Security", ... Etc.) |
| @event | 1 | string | The text denoting the type of the subject event of the alert message. |
| @urgency | 1 | string | "Extreme", "Severe", "Moderate", "Minor", "Unkown", "Unknown" |
| @severity | 1 | string | |
| @certainty | 1 | string | "Observed", "Likely", "Possible", "Unlikely", "Unknown" |

Annotations on table:
- (1) EMERGENCY INFORMATION IDENTIFIER
- (2) EMERGENCY INFORMATION SENDER IDENTIFIER
- (3) EMERGENCY INFORMATION OUTPUT START TIME
- (4) EMERGENCY INFORMATION OUTPUT END TIME
- (5) RECEPTION APPARATUS POSITION INFORMATION
- (6) TO (8) EMERGENCY INFORMATION STATUS, TYPE, AND SCOPE INFORMATION
- (9) TO (13) EMERGENCY INFORMATION EVENT, URGENCY, SEVERITY, AND CERTAINTY INFORMATION

FIG. 9

| | ELEMENT/ATTRIBUTE | MEANING |
|---|---|---|
| (1) | MessageID | EMERGENCY INFORMATION |
| (2) | SenderID | EMERGENCY INFORMATION SENDER IDENTIFIER |
| (3) | startTime | EMERGENCY INFORMATION OUTPUT START TIME IN RECEPTION |
| (4) | endTime | EMERGENCY INFORMATION OUTPUT END TIME IN RECEPTION APPARATUS |
| (5) | Location | RECEPTION APPARATUS POSITION |
| (6) | status | EMERGENCY INFORMATION STATUS [E.G., ACTUAL, EXERCISE, SYSTEM, TEST, DRAFT] |
| (7) | msgType | EMERGENCY INFORMATION TYPE [E.G., ALERT, UPDATE, CANCEL, ACK, ERROR] |
| (8) | scope | EMERGENCY INFORMATION SCOPE [E.G., PUBLIC, RESTRICTED, PRIVATE] |
| (9) | category | EMERGENCY INFORMATION CATEGORY [E.G., GEO, MET, SAFETY, SECURITY] |
| (10) | event | EMERGENCY INFORMATION EVENT [E.G., DISPLAYED TEXT INFORMATION OF ALERT MESSAGE] |
| (11) | urgency | EMERGENCY INFORMATION URGENCY [E.G., IMMEDIATE, EXPECTED, FUTURE, PAST, UNKNOWN] |
| (12) | severity | EMERGENCY INFORMATION IMPORTANCE [E.G., EXTREME, SEVERE, MODERATE, MINOR, UNKNOWN] |
| (13) | certainty | EMERGENCY INFORMATION RELIABILITY [E.G., OBSERVED, LIKELY, POSSIBLE, UNLIKELY, UNKNOWN] |

COMMUNICATION APPARATUS AND DATA PROCESSING METHOD

TECHNICAL FIELD

The present disclosure relates to a communication apparatus and a data processing method. In more detail, the present disclosure relates to a communication apparatus for handling emergency information transmission and reception processes via broadcasting wave or networks, report transmission and reception processes to allow, for example, confirmation as to whether or not emergency information was output from a reception apparatus, and the like, and to a data processing method related to communication data.

BACKGROUND ART

In the United States, an emergency information notification system called EAS (Emergency Alert System) is available, making it possible to quickly notify various emergency information such as meteorological disaster information, terrorism information, and other emergency evacuation information by using this EAS.

It should be noted that among emergency information notified by EAS is emergency information of a variety of levels including messages from President and other national level notices or local notices of a state or local government level.

In order to guarantee the reliability of this emergency alert system (EAS), it is mandatory to conduct a test at each level.

For example, state and county level tests are conducted on a weekly or monthly basis.

Also, a nationwide test was carried out on Nov. 9, 2011 as a national level test.

The tests of this emergency information notification system (EAS) are defined by the regulations of the Federal Communications Commission (FCC).

However, the tests of the emergency information notification system (EAS) that complies with the current regulations are not designed to confirm the reliable notification of emergency information to user terminals serving as real-life endpoints of emergency information such as TVs owned by respective individuals.

The communication tests that comply with the current regulations are tests that confirm whether or not an emergency signal was delivered to broadcasting stations scheduled to deliver data to user terminals without delivering an emergency information signal to the user terminals.

Today, efforts are in full swing to develop and standardize one-way communication from transmission apparatuses such as broadcasting stations and other content servers to reception apparatuses such as TVs, PCs, and mobile terminals by using broadcasting wave and so on or two-way communication via a network such as the Internet, and systems that send and receive broadcasting programs and other content by using one-way communication.

It should be noted that PTL 1 (JP 2014-057227A) is among prior arts that disclose technologies for realizing data delivery via broadcasting wave and networks, for example.

ATSC (Advanced Television Systems Committee) 2.0 is available as a standard on data delivery systems via broadcasting wave and network in the United States. Further, the standardization of ATSC 3.0 is underway at present.

ATSC 3.0 considers a configuration in which a reception apparatus receives ATSC broadcasting-compliant AV segments and signaling data having control information stored therein and realizes reproducing of broadcasting content based on various control in accordance with signaling data. The reception apparatus has an ATSC 3.0-supporting physical layer (ATSC-PHY) and middleware implemented therein that handle broadcasting reception processes.

Specifically, for example, the configuration under study allows for a broadcasting content output process using so-called client applications, application programs used on the Internet and so on, in an 'as-is' fashion and data processing using a variety of applications provided by broadcasting wave and so on.

ATSC 3.0 whose standardization is advancing is premised on the use of the Integrated Public Alert and Warning System (IPAWS), a next-generation emergency information notification system.

This Integrated Public Alert and Warning System (IPAWS) is configured to send a data file that complies with the CAP (Common Alerting Protocol) format for transporting emergency information or a file equivalent thereto and an application to user terminals (e.g., TVs) so as to permit data analysis, selection of necessary information and output of the information on the user terminal side rather than delivering emergency information from broadcasting stations to all user terminals (e.g., TVs) at once and causing all the user terminals to output the same emergency information as has been done up to now.

Various additional information related to emergency information is attached to the CAP message, a data file that complies with the CAP format. Additional information includes not only an emergency message output on the reception apparatuses but also various attribute information of emergency information such as emergency information category, emergency information urgency and sender information, and information related to regions to which emergency information needs to be notified.

The user terminals that have received the CAP message can output (display) information on them by analyzing the received CAP message and selecting necessary information in accordance with, for example, the category and the urgency of emergency information, the current locations of the user terminals, or the like.

In a case where such a CAP message is used, it is necessary to confirm whether or not emergency information was reliably output on the user terminals.

Therefore, the tests of the emergency information notification system (EAS) that comply with the current regulations are unable to confirm whether or not emergency information is reliably output from the user terminals, and it cannot be said that the tests are adequate for confirming the reliable notification of emergency information.

CITATION LIST

Patent Literature

[PTL 1]
  JP 2014-057227A

SUMMARY

Technical Problem

The present disclosure has been devised, for example, in light of the above problem, and it is an object of the present disclosure to provide a communication apparatus and a data processing method that allow confirmation as to whether or not emergency information was reliably output at real-life endpoints of emergency information.

Solution to Problem

A first aspect of the present disclosure is a communication apparatus that receives and outputs emergency information. The communication apparatus includes a data processing section and a communication section. The data processing section generates an emergency information viewing result report that contains a record of emergency information viewing result information. The communication section sends the generated emergency information viewing result report. The data processing section generates an emergency information viewing result report that contains a record of an identifier of the emergency information output on the communication apparatus and output time information of the emergency information.

Further, a second aspect of the present disclosure is a communication apparatus that includes a communication section and a data processing section. The communication section receives an emergency information viewing result report sent by an emergency information reception apparatus. The data processing section performs a process of analyzing the emergency information viewing result report.

Still further, a third aspect of the present disclosure is a communication apparatus that includes a data processing section and a communication section. The data processing section generates an emergency information output application. The communication section sends the emergency information output application to a reception apparatus. The emergency information output application is an application that includes not only emergency information output from the reception apparatus but also an output control program of the emergency information and a program that generates an emergency information viewing result report for the reception apparatus.

Still further, a fourth aspect of the present disclosure is a data processing method carried out by a communication apparatus that receives and outputs emergency information. A data processing section generates an emergency information viewing result report that contains a record of emergency information viewing result information. A communication section performs a process of sending the generated emergency information viewing result report. The data processing section generates an emergency information viewing result report that contains a record of an identifier of the emergency information output by the communication apparatus and output time information of the emergency information.

Still further, a fifth aspect of the present disclosure is a data processing method carried out by a communication apparatus that receives an emergency information viewing result report from an emergency information reception apparatus. A communication section receives an emergency information viewing result report sent by the emergency information reception apparatus. A data processing section performs an analysis process on the emergency information viewing result report.

Still further, a sixth aspect of the present disclosure is a data processing method carried out by a communication apparatus that performs an emergency information transmission process. A data processing section generates an emergency information output application. A communication section performs a process of sending the emergency information output application to a reception apparatus. The emergency information output application is an application that includes not only emergency information output on the reception apparatus but also an output control program of the emergency information and a program that generates an emergency information viewing result report on the reception apparatus.

Still other objects, features, and advantages of the present disclosure will become apparent from a more detailed description based on the embodiment of the present disclosure which will be described later and the attached drawings. It should be noted that the system in the present specification has a configuration that includes a logical set of a plurality of apparatuses and that the apparatuses, each serving as a component, need not necessarily be accommodated in the same housing.

Advantageous Effect of Invention

According to a configuration of an embodiment of the present disclosure, a configuration is realized that permits confirmation of emergency information viewing results on a reception apparatus, an endpoint of emergency information such as TV.

Specifically, a data processing section of a reception apparatus such as TV that receives and outputs emergency information generates an emergency information viewing result report that contains a record of emergency information viewing result information and sends the generated emergency information viewing result report to a management server and so on. The data processing section generates an emergency information viewing result report that contains a record of an identifier of emergency information output by the reception apparatus and emergency information output time information in accordance with a CDM (Consumption Data Message) format. The CDM keeps a record of not only emergency information output time information but also reception apparatus position information, emergency information sender information, and so on.

The present configuration realizes a configuration that permits confirmation of emergency information viewing results on a reception apparatus, an endpoint of emergency information such as TV.

It should be noted that the effect described in the present specification is merely illustrative and is not limited and that there may be additional effects.

BRIEF DESCRIPTION OF DRAWINGS

FIG. 5 is a diagram describing a CDM (Consumption Data Message) format.

FIG. 6 is a diagram describing transmission data of a transmission apparatus.

FIG. 7 is a diagram describing emergency information viewing result data recorded in a CDM.

FIG. 8 is a diagram describing emergency information viewing result data recorded in a CDM.

FIG. 9 is a diagram describing emergency information viewing result data recorded in a CDM.

DESCRIPTION OF EMBODIMENT

A detailed description will be given below of a communication apparatus and a data processing method of the present disclosure with reference to drawings. It should be noted that the description will be given in accordance with the following items.

1. Outline of the Emergency Information Notification System
2. Configuration for Performing a Process of Confirming Emergency Information Viewing Results of the Present Disclosure
2-1. Configuration Example of the Communication System and CDM
2-2. Processing Example Using CDM as Emergency Information Viewing Result Record Report
3. Transmission Data of the Transmission Apparatus, Data Reception by the Reception Apparatus, and an Example of the Data Output Process
4. Processing Sequence Handled by the Reception Apparatus that Receives and Outputs Emergency Information
5. Processes of Receiving and Analyzing the CDM Sent from the Reception Apparatus Performed by the Viewing Information Analysis Apparatus
6. Configuration Examples of the Transmission Apparatus, the Reception Apparatus, and the Viewing Information Analysis Apparatus
7. Conclusion of the Configuration of the Present Disclosure 1. Outline of the Emergency Information Notification System A description will be given first of the outline of an emergency information notification system with reference to FIG. 1 onward.

As described earlier, in the United States, an emergency information notification system called EAS (Emergency Alert System) is available, making it possible to quickly notify various emergency information such as meteorological disaster information, terrorism information, and other emergency evacuation information by using this EAS.

Figure 1:
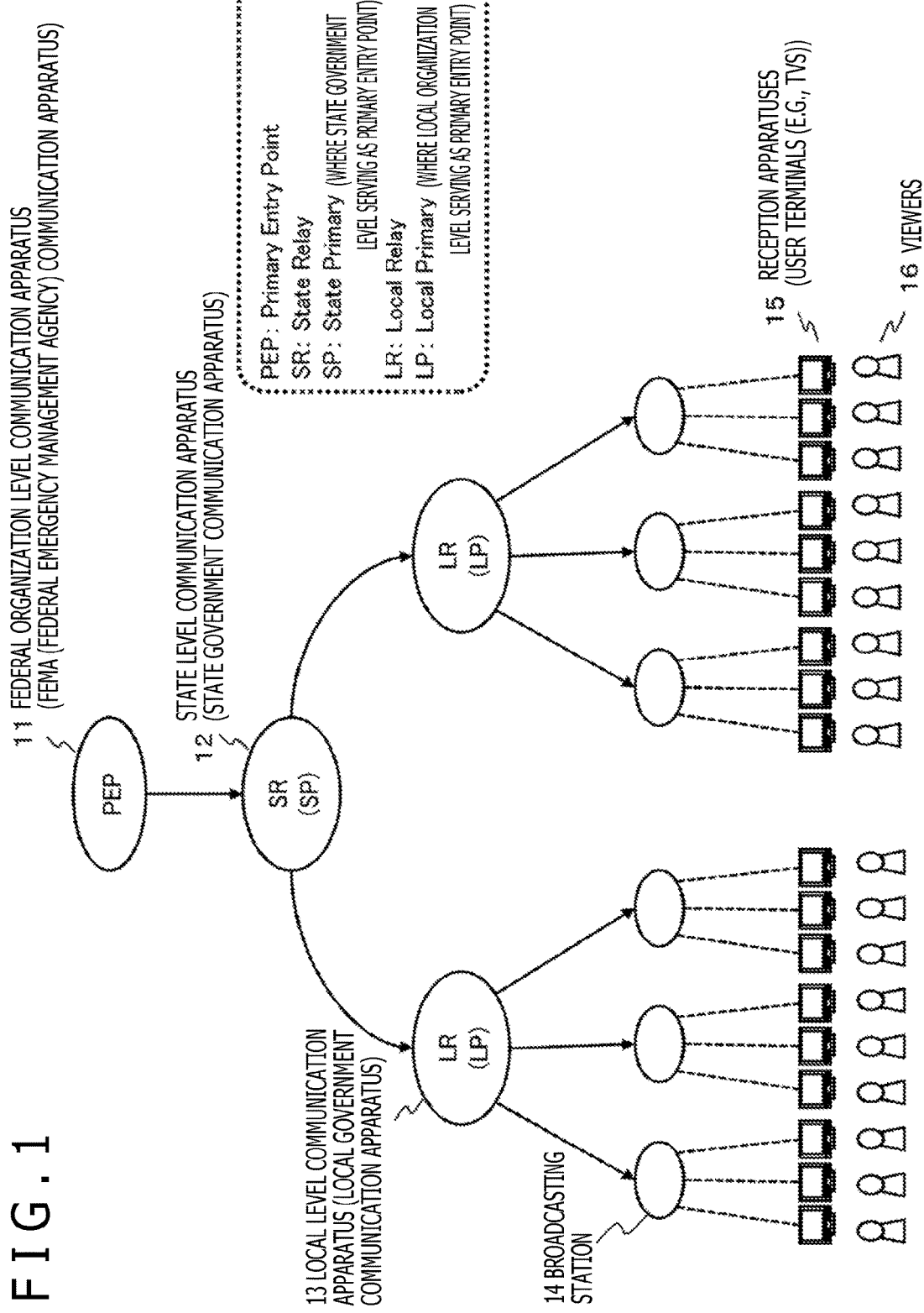
FIG. 1 is a diagram describing a configuration example of an emergency information communication system.

FIG. 1 is a diagram describing a configuration example of an emergency information communication system.

It should be noted that among emergency information is emergency information of a variety of levels including national level notices or local notices of state or local government levels.

FIG. 1 illustrates each of the following communication apparatuses, reception apparatuses, and viewers:

(a) Federal organization level communication apparatus 11
(b) State government level communication apparatus 12
(c) Local government level communication apparatus 13
(d) Broadcasting stations 14
(e) Reception apparatuses 15
(f) Viewers 16

The (a) federal organization level communication apparatus 11 is the top communication apparatus at the national level in the United States. National level emergency information is delivered from the federal organization level communication apparatus 11 as a primary entry point.

That is, the federal organization level communication apparatus 11 functions as a primary entry point (PEP).

This national level emergency information is sent to the (e) reception apparatuses 15 via the (b) state government level communication apparatus 12, the (c) local government level communication apparatuses 13, the (d) broadcasting stations 14, and the (e) reception apparatuses 15.

Emergency information is output on the reception apparatuses 15 and viewed by the (f) viewers 16.

In these communication processes, the (b) state government level communication apparatus 12 and the (c) local government level communication apparatuses 13 function as emergency information transfer apparatuses (emergency information relay apparatuses).

That is, the (b) state government level communication apparatus 12 functions as a state level transfer apparatus (State Relay (SR)).

The (c) local government level communication apparatuses 13 function as local level transfer apparatuses (Local Relays (LR)).

Also, for example, the (b) state government level communication apparatus 12 is a sender of state level emergency information.

In this case, the (b) state government level communication apparatus 12 serves as a primary entry point of emergency information and functions as a state primary (SP).

Also, for example, the (c) local government level communication apparatuses 13 are senders of local government level emergency information.

In this case, the (c) local government level communication apparatuses 13 serve as primary entry points of emergency information and function as local primaries (LPs).

Thus, the emergency information communication processes are conducted by using the (a) federal organization level communication apparatus 11, the (b) state government level communication apparatus 12, or the (c) local government level communication apparatuses 13 as a primary entry point depending on whether emergency information is directed to the whole country, a state, or a region so that emergency information is sent to the reception apparatus (user terminal (e.g., TV)) 15 of each viewer, an endpoint, by using the communication apparatuses below the primary entry point as transfer (relay) communication apparatuses.

In order to guarantee the reliability of this emergency information notification system (EAS), it is mandatory to conduct a test at each level.

The tests of this emergency information notification system (EAS) are defined by the regulations of the Federal Communications Commission (FCC).

Figure 2:
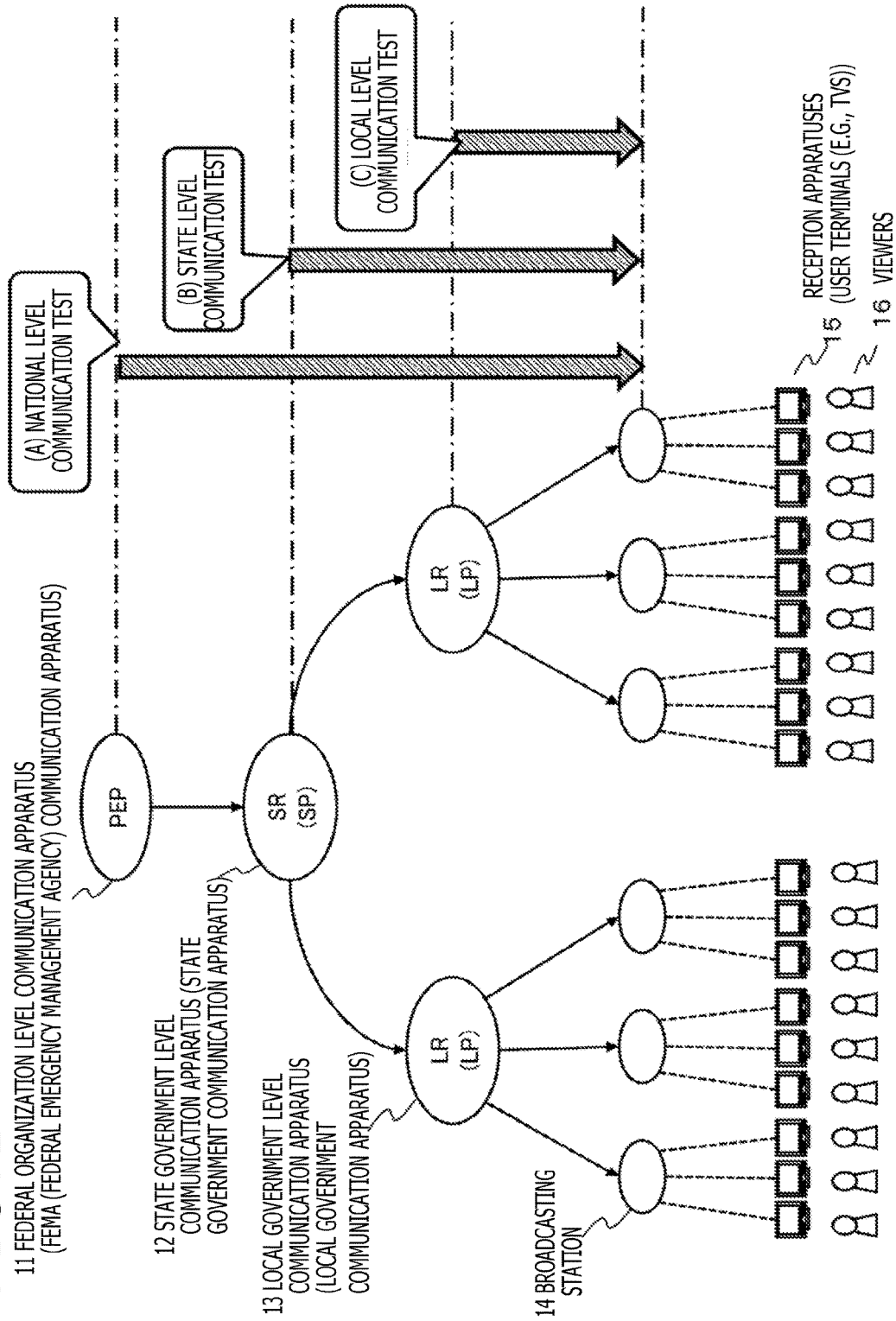
FIG. 2 is a diagram describing examples of tests of the emergency information notification system.

FIG. 2 is a diagram describing the outline of the tests of the emergency information notification system (EAS) that comply with the current regulations.

As illustrated in FIG. 2, the tests of the emergency information notification system (EAS) that comply with the current regulations are defined such that three kinds of tests should be conducted as follows:

(A) National level communication test to confirm whether communication processes were performed reliably from the federal organization level communication apparatus 11 as a primary entry point down to the broadcasting stations 14

(B) State level communication test to confirm whether communication processes were performed reliably from the state government level communication apparatus 12 as a primary entry point down to the broadcasting stations 14

(C) Local level communication test to confirm whether communication processes were performed reliably from the local government level communication apparatus 13 as a primary entry point down to the broadcasting stations 14

None of these tests are designed to confirm the reliable notification of emergency information to the reception apparatuses 15, real-life endpoints of emergency information, i.e., TVs owned by respective individuals.

All what is defined under the current test regulations is that whether or not a test signal was delivered to the broadcasting station for handling data delivery to user terminals should be confirmed without delivering an emergency information test signal down to user terminals.

As described earlier, ATSC (Advanced Television Systems Committee) 3.0, a standard on data delivery systems via broadcasting wave and networks in the United States is premised on the use of the Integrated Public Alert and Warning System (IPAWS), a next-generation emergency information notification system.

Figure 3:
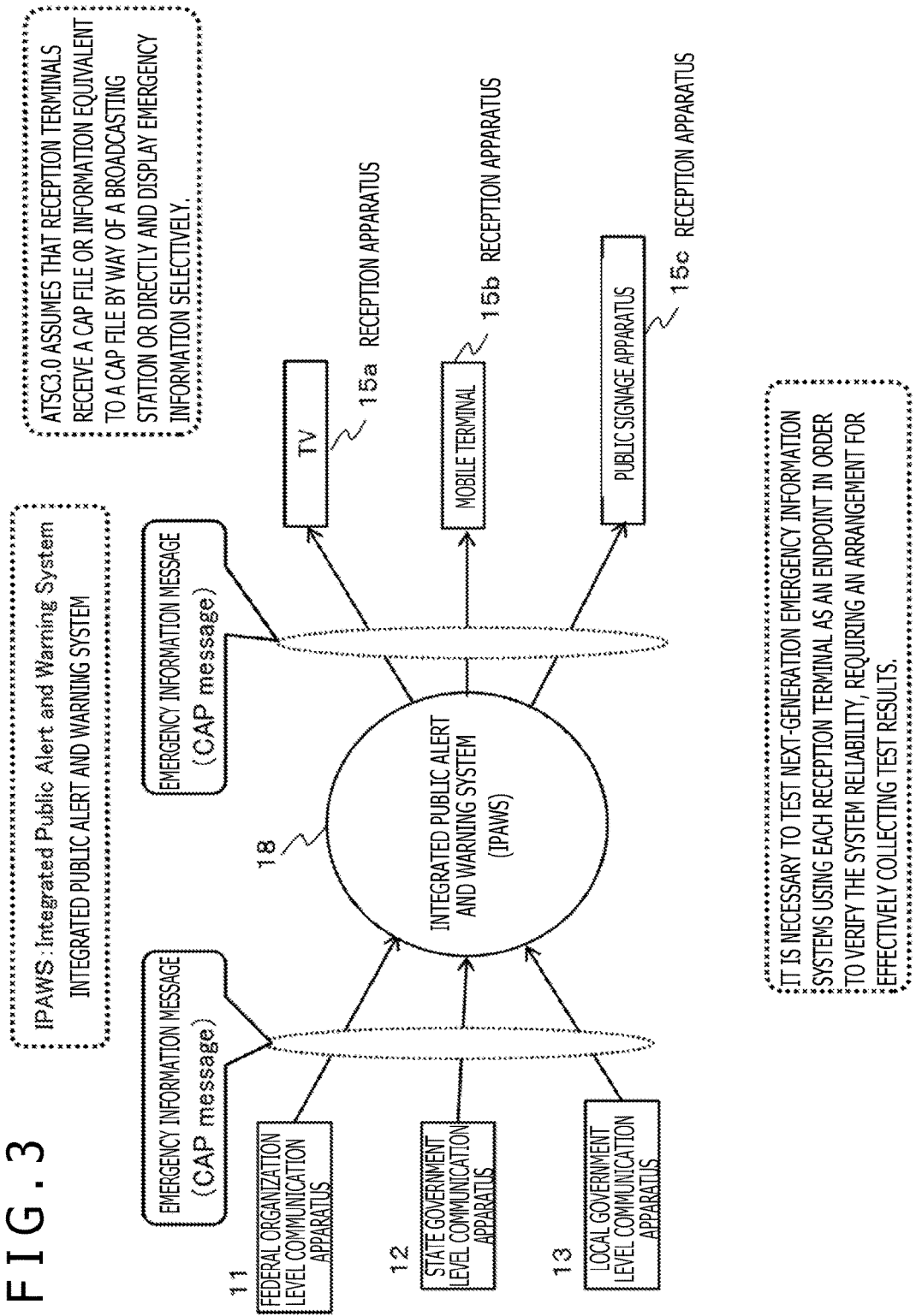
FIG. 3 is a diagram describing a configuration example of a next-generation type emergency information communication system.

FIG. 3 is a diagram describing a communication configuration using an Integrated Public Alert and Warning System (IPAWS) 18. Each of the federal organization level communication apparatus 11 serves as senders of national level emergency information, the state government level communication apparatus 12 serves as senders of state level emergency information, and the local government level communication apparatus 13 serves as senders of local level emergency information is configured to send a data file that complies with the CAP (Common Alerting Protocol) format for transporting emergency information or a file equivalent thereto to the various reception apparatuses 15.

Although FIG. 3 illustrates a TV 15a, a mobile terminal 15b, and a public signage apparatus 15c as examples of the reception apparatuses 15, a CAP message containing emergency information will be sent to various different types of reception apparatuses in addition thereto.

As described earlier, various attribute information of emergency information is attached to a CAP message, including emergency information category, emergency information urgency and sender information, and information related to regions to which emergency information needs to be notified, and so on which is various detailed information related to the emergency information title.

When this CAP message is received, the reception apparatuses 15a to 15c analyze the received CAP message, select necessary information in accordance with the emergency information category and urgency, the current position of the reception apparatus 15, or the like, and output (display) the information.

In a case where such a CAP message is used, it is necessary to confirm whether or not emergency information is reliably selected and displayed on the user terminals.

Therefore, the tests of the emergency information notification system (EAS) that complies with the current regulations, i.e., the tests using broadcasting stations as endpoints, do not confirm whether or not emergency information was reliably output on the user terminals, and it cannot be said that the tests are adequate for confirming the reliable notification of emergency information.

2. Configuration for Performing a Process of Confirming Emergency Information Viewing Results of the Present Disclosure A description will be given below of a configuration that permits confirmation of the reliable transmission of emergency information to reception apparatuses such as user terminals, real-life endpoints of emergency information, the output of emergency information on the reception apparatuses, and further the output status of emergency information output on the reception apparatuses, and so on.

2-1. Configuration Example of the Communication System and CDM

The configuration for emergency information delivery confirmation of the present disclosure which will be described below permits confirmation of emergency information viewing results on a reception apparatus 30 by using a CDM (Consumption Data Message) that is employed in the United States for audience rating survey and for other purposes.

A description will be given first of the configuration for using a CDM with reference to FIG. 4 onward.

Figure 4:
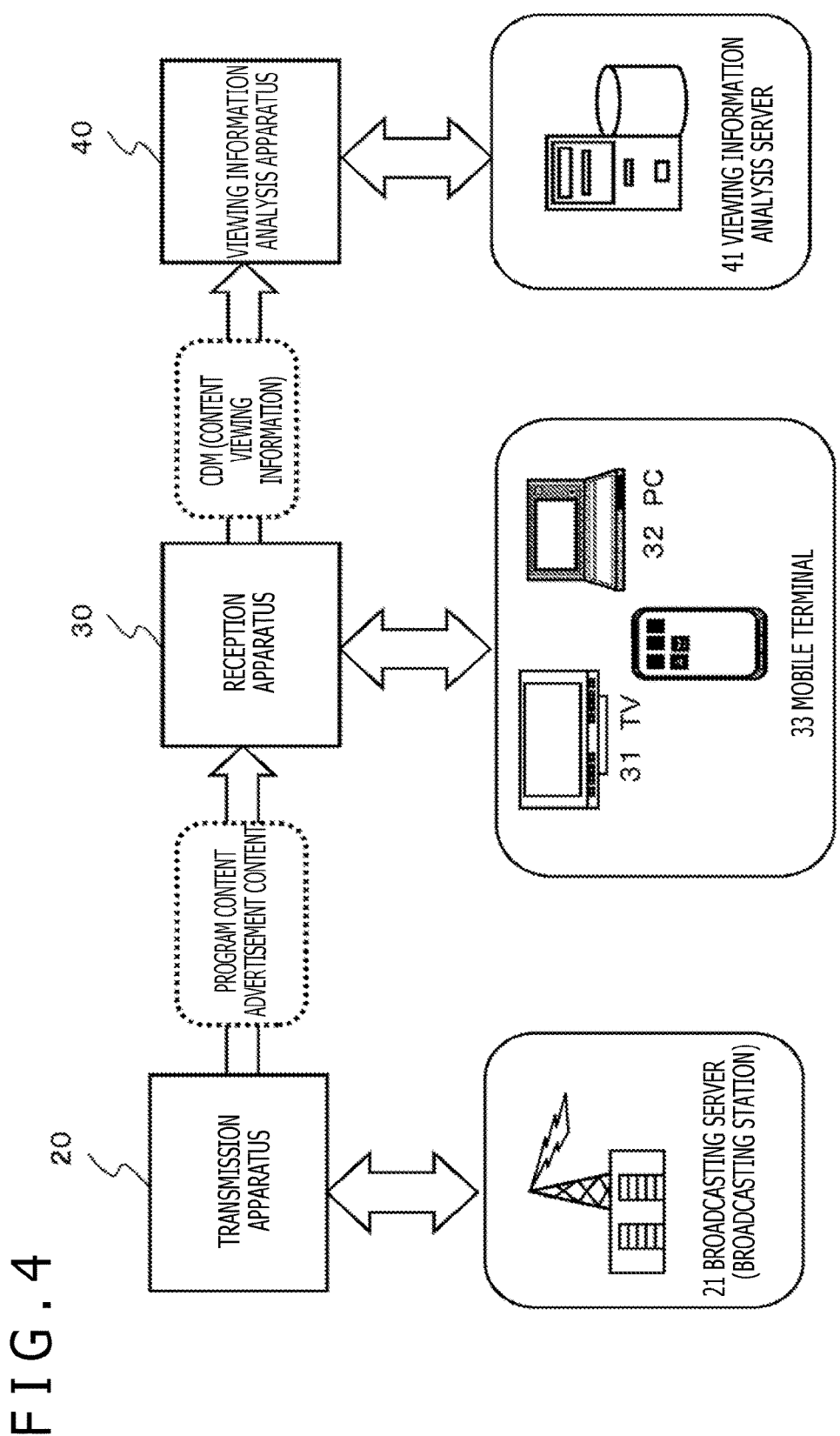
FIG. 4 is a diagram describing a configuration example of a communication system to which a CDM (Consumption Data Message) is applied.

FIG. 4 illustrates a communication system for generating report data i.e., a CDM (Consumption Data Message), and sending the CDM to a viewing analysis apparatus 40 such as a viewing analysis server 41. The report data summarizes viewing information related to broadcasting content and advertisement content sent by the reception apparatus 30 of each user such as TV from a transmission apparatus 20 that includes, for example, a broadcasting server 21 of a broadcasting station.

Standards on broadcasting content viewing history collection process in reception apparatuses such as TVs (Usage Reporting) are included in ATSC (Advanced Television Systems Committee) 2.0 described above, a standard on data delivery systems via broadcasting wave and networks in the United States, and in ATSC 3.0 whose standardization is underway at present.

Specifically, the broadcasting service reception apparatus of each user such as TV creates a CDM (Consumption Data Message), report data on broadcasting service viewing results. The reception apparatus defines a procedure for sending the created CDM to the viewing information analysis server (Service Usage Data Server), a viewing information analysis apparatus, and a CDM format.

For example, as illustrated in FIG. 4, the transmission apparatus 20 such as the broadcasting server (broadcasting station) sends various broadcasting content such as program content and advertisement content by using broadcasting wave and other means.

The reception apparatus 30, a user terminal such as the TV 31, receives broadcasting content sent via a communication network such as broadcasting wave and reproduces the content.

At this time, the reception apparatus 30 executes a CDM creation algorithm defined in advance, creates a CDM (Consumption Data Message) file, report data based on viewing results, and sends the created CDM file to the viewing analysis apparatus 40 which is specifically the viewing information analysis server (Service Usage Data Server) 40.

A description will be given of the current CDM format with reference to FIG. 5.

The current CDM format has, for example, the following information recording areas:
(1) Viewed channel number
(2) Viewing start time
(3) Viewing end time It should be noted that the channel number that displays content on the reception apparatus 30 may be, for example, a specific channel set by the reception apparatus 30 and that the channel number may not match the original physical broadcasting channel number of content. The channel number recorded in the CDM is a channel number that allows identification of target content to be viewed in the viewing information analysis apparatus 40 depicted in FIG. 4, the destination of the CDM. Such a channel number that allows identification of target content to be viewed is called a virtual channel number.

The reception apparatus 30, a user terminal such as the TV, executes a CDM creation program stored in advance in the storage section, creates a CDM file that contains a record of the reception channel number, the viewing start time, and the viewing end time on the reception apparatus 30 in accordance with the format depicted in FIG. 5, and sends the created CDM file to the viewing information analysis apparatus 40 depicted in FIG. 4.

It should be noted that the transmission apparatus 20 such as broadcasting station carries out content transmission to the reception apparatus 30, for example, in accordance with the MPEG-DASH standard, a standard for adaptive streaming technology.

The MPEG-DASH standard includes the following two standards:
(a) Standard on manifest file for describing metadata, video and audio file management data (MPD: Media Presentation Description)
(b) Standard on file format for transporting video content (segment format)

The transmission apparatus 20 carries out content delivery to the reception apparatus 30 in accordance with the above MPEG-DASH standard.

The transmission apparatus 20 encodes content data and creates a data file that includes encoded data and metadata of the encoded data. The encoding process is conducted, for example, in accordance with the MP4 file format defined in MPEG. It should be noted that in a case where the transmission apparatus 20 creates a data file in MP4 format, the encoded data file is called, for example, "mdat," and the metadata is called, for example, "moov" or "moof."

An example of transmission data of the transmission apparatus 20 will be described with reference to FIG. 6.

As depicted in FIG. 6, the transmission apparatus 20 that carries out data transmission in accordance with the MPEG-DASH standard sends a plurality of kinds of data that are broadly classified as follows:
(a) Video data
(b) Audio data
(c) Signaling data Video and audio data is sent, for example, in the form of an AV segment as divided pieces of data. The AV segment includes video and audio data reproduced by the reception apparatus 30, i.e., for example, program content provided by a broadcasting station. For example, an AV segment includes MP4 encoded data (mdat) and metadata (moov, moof). It should be noted that an AV segment is also referred to as a DASH segment.

On the other hand, signaling data includes, for example, not only program schedule information such as program listings and address information (e.g., URL (Uniform Resource Locator)) required to acquire programs but also further various control information including guidance information made up of information required for content reproducing process such as codec information (e.g., coding scheme) and application control information.

In a case where video and audio data is received by way of broadcasting wave or other means and reproduced, the reception apparatus 30 receives signaling data ahead of video and audio data, acquires an AV segment storing the target content by using access information, control information, and other information recorded in the signaling data, and proceeds with the reproducing process.

Signaling data is sent from the transmission apparatus 20, for example, in the form of data in XML (Extensible Markup Language) format.

Signaling data is sent repeatedly at all times, and it is sent repeatedly on a frequent basis such as every 100 milliseconds.

This is designed to allow the reception apparatus (client) to acquire signaling data immediately at any time.

It is possible for the reception apparatus (client) to carry out, without delay, the processes required to receive and reproduce program content such as acquisition of the access address of necessary program content and codec setup process based on signaling data that can be acquired at all times.

Signaling data includes not only the above emergency information but also destination information of the CDM, viewing result report data, such as the address (URL) of the viewing information analysis apparatus 40 depicted in FIG. 4 and channel information and other data to be recorded in the CDM.

In a case where broadcasting content received via broadcasting wave or other means is viewed, the reception apparatus 30 acquires CDM recording data (e.g., viewed channel information) transported by signaling data as illustrated in step S11 of FIG. 6 and creates a CDM that complies with the format described earlier with reference to FIG. 5. Further, the reception apparatus 30 can send a CDM to the CDM destination information (e.g., address such as URL) transported by signaling data.

2-2. Processing Example Using CDM as Emergency Information Viewing Result Record Report A description will be given next of a processing example in which a CDM (Consumption Data Message), report data generated based on the broadcasting service viewing results on a reception apparatus described above, is used as an emergency information viewing result record report.

As described earlier with reference to FIGS. 5 and 6, the broadcasting service reception apparatus such as TV of each user creates a CDM (Consumption Data Message) in the format described earlier with reference to FIG. 5 based on broadcasting service viewing results and sends the created CDM to a viewing information analysis apparatus.

The current CDM format has, for example, the following information recording areas as described earlier with reference to FIG. 5:
(1) Viewed channel number
(2) Viewing start time
(3) Viewing end time The reception apparatus 30 such as TV, a user terminal, executes a CDM creation program stored in advance in the storage section, creates a CDM file that complies with the format depicted in FIG. 5 that contains a record of a reception channel number and viewing start and end times, and sends the created CDM file to the viewing information analysis apparatus 40 depicted in FIG. 4.

In the embodiment which will be described below, this CDM format is extended, allowing to record output result information of emergency information to the CDM in a case where emergency information is output on the reception apparatus 30 such as TV, a user terminal.

In a case where emergency information is received and output on the reception apparatus 30, the reception apparatus 30 creates a CDM that contains a record of emergency information viewing result data by recording the identifier of output emergency information, output time information, and so on to the CDM and sends the CDM to the management server such as the viewing information analysis apparatus 40 depicted in FIG. 4.

The viewing information analysis apparatus 40 can confirm the fact that emergency information was actually output on each reception apparatus and further the type of output emergency information and the output time by analyzing the CDM acquired from each reception apparatus. That is, it is possible to reliably confirm that emergency information was reliably output on the reception apparatuses, actual endpoints.

It should be noted, however, that the current CDM format has no data field for recording an emergency information viewing history.

In order to record emergency information viewing results to a CDM, therefore, it is necessary to change the current CDM format.

A description will be given of an example of a new CDM format that permits recording of emergency information viewing results by extending the current DCM format with reference to FIG. 7 onward.

FIG. 7 is a diagram illustrating part of an extended CDM format, depicting a CDM format having a field for recording emergency information viewing results.

FIG. 8 is a diagram illustrating the meanings of main data fields on emergency information viewing results that have been added to the diagram depicting the CDM format having similar emergency information viewing result recording fields as depicted in FIG. 7.

As illustrated in FIG. 8, for example, the following emergency information viewing result data recording fields are set in the new CDM format:

(1) Emergency information identifier
(2) Emergency information sender identifier
(3) Emergency information output start time
(4) Emergency information output end time
(5) Reception apparatus position information
(6) to (8) Emergency information status, type, and scope information
(9) to (13) Emergency information category, event, urgency, severity, and certainty information These new emergency information viewing result data recording fields, for example, are specified in the extended CDM format.

It should be noted that the reception apparatus 30, for example, receives emergency information that complies with the CAP (Common Alerting Protocol) format described earlier and outputs emergency information to the reception apparatus 30 as necessary in accordance with various emergency information response attribute information and control information recorded in the CAP format data.

The CAP format data contains a record of various emergency information response attributes and control information such as emergency information identifier, emergency information urgency, and information on regions where emergency information should be output.

The reception apparatus 30 analyzes information recorded in this CAP format data and outputs emergency information to the reception apparatus 30 based on analysis results.

The reception apparatus 30 allows, for example, for selection of emergency information that needs to be output based on the CAP message, making it possible to output only selected emergency information to the reception apparatus 30.

It should be noted that an output control application (program) for emergency information that involves the CAP analysis process is provided to the reception apparatus from a broadcasting station or other external server.

Alternatively, a configuration may be used in which an application (program) stored in advance in the storage section of the reception apparatus 30 is used.

Also, update programs are provided to the reception apparatus as necessary from a broadcasting station or other external server.

It should be noted that a configuration may be used in which the transmission apparatus such as broadcasting station or other external server analyzes the CAP message and sends an emergency information output application, generated based on CAP analysis results, to the reception apparatus.

The emergency information output application sent from the transmission apparatus to the reception apparatus includes not only an emergency information message output on the reception apparatus but also, for example, video data and other output data such as meteorological map representing weather conditions and geographical information representing evacuation regions, and an output control program for these pieces of data. Further, various kinds of CAP data recorded in the CDM as emergency information viewing result data are also included.

The reception apparatus can display, on the display section thereof, an emergency information message and other video data related to emergency information by executing the application received from the transmission apparatus.

It should be noted that Java (registered trademark) Script, an application that is executed on a browser, is available as among applications provided to the reception apparatus from the transmission apparatus.

The reception apparatus can display, on the display section thereof, various content generated as a result of execution of the application along with the output of the program.

Further, the reception apparatus 30 performs a process of creating CDM format data depicted in FIGS. 7 and 8 and outputting the data to the viewing analysis apparatus 40.

When emergency information is output on the reception apparatus 30, for example, the reception apparatus 340 performs a process of recording information indicating the output status of emergency information as a log data, generating report data that complies with the CDM format (CDM report data) based on the recorded log data, and outputting the data to the viewing analysis apparatus 40.

The reception apparatus 30 has a program that handles a process of creating a CDM (report data) that complies with the CDM format and sending the CDM. The program is stored in advance in the storage section of the reception apparatus 30. Alternatively, the program is provided as necessary to the reception apparatus from a broadcasting station or other external server.

Also, update programs are provided to the reception apparatus as necessary from a broadcasting station or other external server.

It should be noted that a configuration may be used in which the emergency information output application described earlier, i.e., the emergency information output application that includes output data such as emergency information message and video and a program for controlling the output of these pieces of data includes a CDM creation program that handles CDM creation and output processes.

That is, the transmission apparatus provides, to the reception apparatus, an application that includes an emergency information output control program and a CDM creation program.

In this case, the reception apparatus can output (display) emergency information by executing the application received from the transmission apparatus and further create a CDM that contains a record of emergency information output status in accordance with output emergency information as a result of the execution of the application and send the CDM to the viewing status analysis apparatus.

It should be noted that a configuration may be used in which the emergency information output application and the CDM creation application are different and separate applications and in which the transmission apparatus provides each of these separate applications to the reception apparatus.

Also, a configuration may be used in which the emergency information output application described earlier includes a program or API for acquiring emergency information viewing result information for CDM recording such as data that complies with the CAP format. Further, a configuration may be used in which the CDM creation application uses the acquired data by using these functions and creates a CDM.

A description will be given of information recorded to each data field of the extended CDM format data with reference to FIG. 9.

(1) Emergency Information Identifier (MessageID)

Emergency information identifier is an identifier of emergency information output on the reception apparatus.

It should be noted that this emergency information identifier is recorded in emergency information configuration data that complies with the CAP format received by the reception apparatus 30, i.e., CAP format data, and that the reception apparatus 30 acquires the emergency information identifier from the CAP format data that stores the received emergency information, and records the acquired emergency information identifier to the emergency information identifier recording field of the CDM format data.

(2) Emergency Information Sender Identifier (SenderID)

Emergency information sender identifier is an identifier of a sender of emergency information output on the reception apparatus. An identifier is recorded that permits, for example, identification of which of the federal organization level communication apparatus 11, the state government level communication apparatus 12, and the local government level communication apparatus 13 depicted in FIGS. 1 to 3 the sender is, and that permits identification of which state or region the communication apparatus is in where the sender is the state government level communication apparatus 12 or the local government level communication apparatus 13.

It should be noted that this emergency information sender identifier is recorded in emergency information configuration data that complies with the CAP format received by the reception apparatus 30, i.e., CAP format data, and that the reception apparatus 30 acquires the emergency information sender identifier from the CAP format data that stores the received emergency information, and records the acquired emergency information sender identifier to the emergency information sender identifier recording field of the CDM format data.

(3) Emergency Information Output Start Time (startTime)

Emergency information output start time is a time when the output of emergency information to the reception apparatus began.

The time when the output of emergency information to the reception apparatus began is acquired by referring to the internal clock of the reception apparatus or externally received time information, and this time information is recorded.

(4) Emergency Information Output End Time (endTime)

Emergency information output end time is a time when the output of emergency information to the reception apparatus ended.

The time when the output of emergency information to the reception apparatus began is acquired by referring to the internal clock of the reception apparatus or externally received time information, and this time information is recorded.

It should be noted that although a configuration is used in which emergency information output start and end times are recorded in the present example, a configuration may be used in which an emergency information output duration is recorded, for example.

Also, output start time or output end time and output duration may be recorded in combination.

(5) Reception Apparatus Position Information (Location)

Reception apparatus position information is position information of the reception apparatus when emergency information was output.

Specifically, a Zip Code, latitude and longitude information, state number (Country ANSI numbers), and so on are recorded.

These pieces of information are recorded by using information recorded in the memory of the reception apparatus or position information acquired using a position information acquisition function of the reception apparatus such as GPS.

(6) Emergency Information Status Information (Status)

Emergency information status information is information indicating an emergency information status.

Specifically, for example, information indicating a status of emergency information received by the reception apparatus such as Actual, Exercise, System, Test, and Draft is recorded.

(7) Emergency Information Type Information (Msgtype)

Emergency information type information is information indicating a message type of emergency information, i.e., a type.

Specifically, for example, information indicating a type of emergency information received by the reception apparatus such as Alert, Update, Cancel, Ack, and Error is recorded.

(8) Emergency Information Scope Information (Scope)

Emergency information scope information is information indicating a scope of emergency information, i.e., a scope for application of emergency information, and so on.

Specifically, for example, information indicating a scope for application of emergency information and so on received by the reception apparatus such as Public, Restricted, and private is recorded.

(9) Emergency Information Category Information (Category)

Emergency information category information is information indicating a category of emergency information, i.e., a category of emergency information type, and so on.

Specifically, for example, information indicating a type of emergency information received by the reception apparatus such as Geo, Met, Safety, and Security is recorded.

(10) Emergency Information Event Information (Event)

Emergency information event information is information indicating an event of emergency information, i.e., an event carried out as a result of reception of emergency information, and so on.

Specifically, for example, displayed text information of a warning message and so on is recorded.

(11) Emergency Information Urgency Information (Urgency)

Emergency information urgency information is information indicating an urgency of emergency information.

Specifically, for example, an urgency of emergency information received by the reception apparatus such as immediate, Expected, Future, Past, and Unknown is recorded.

(12) Emergency Information Severity Information Severity ( )

Emergency information severity information is information indicating a severity of emergency information.

Specifically, for example, a severity of emergency information received by the reception apparatus such as Extreme, Severe, Moderate, Minor, and Unknown is recorded.

(13) Emergency Information Certainty Information (Certainty)

Emergency information certainty information is information indicating a certainty of emergency information.

Specifically, for example, a certainty of emergency information received by the reception apparatus such as Observed, Likely, Possible, Unlikely, and Unknown is recorded.

It should be noted that emergency information status, type, and scope information numbered (6) to (8) and emergency information category, event, urgency, severity, and certainty information numbered (9) to (13) described above is all emergency information configuration data that complies with the CAP format received by the reception apparatus 30, i.e., information recorded in the CAP format data.

The reception apparatus 30 acquires emergency information status, type, and scope information numbered (6) to (8) and emergency information category, event, urgency, severity, and certainty information numbered (9) to (13) described above from the CAP format data that stores the received emergency information, and records the acquired emergency information to the respective information recording fields of the CDM format data.

3. Transmission Data of the Transmission Apparatus, Data Reception by the Reception Apparatus, and an Example of the Data Output Process A description will be given next of transmission data of the transmission apparatus, data reception by the reception apparatus, and an example of the data output process with reference to FIG. 10.

The transmission apparatus 20 includes the broadcasting server (broadcasting station) 21 described earlier with reference to FIG. 4, for example.

As described earlier with reference to FIG. 6, the transmission apparatus 20 carries out data transmission, for example, in accordance with the MPEG-DASH standard and, as depicted in FIG. 6, sends a plurality of kinds of data that are broadly classified as follows:
 (a) Video data
 (b) Audio data
 (c) Signaling data Video and audio data is content data making up, for example, television programs.

These pieces of data are sent in the form of AV segments as divided pieces of data.

On the other hand, signaling data includes, for example, not only program schedule information such as program listings and address information (e.g., URL (Uniform Resource Locator)) required to acquire programs but also further various control information including guidance information made up of information required for content reproducing process such as codec information (e.g., coding scheme) and application control information.

Signaling data is sent repeatedly at all times, and it is sent repeatedly on a frequent basis such as every 100 milliseconds.

This is designed to allow the reception apparatus 30 to acquire signaling data immediately at any time.

It is possible for the reception apparatus 30 to carry out, without delay, the processes required to receive and reproduce program content such as acquisition of the access address of necessary program content and codec setup process based on signaling data that can be acquired at all times.

Emergency information described above is sent as signaling information.

Emergency information is sent from the transmission apparatus 20 to the reception apparatus 30 as data that complies with the CAP (Common Alerting Protocol) format for transporting emergency information described earlier.

Various information related to emergency information is attached to the CAP message. Attached information includes not only emergency information output on the reception apparatus but also various attribute information of emergency information such as emergency information category, emergency information urgency, sender information, and information related to regions to which emergency information needs to be notified.

The reception apparatus 30 that has received the CAP message can output (display) information on user terminal by analyzing the received CAP message and selecting necessary information in accordance with, for example, a category and an urgency of emergency information or the current location of the user terminal.

Signaling data also includes "CDM transmission information" that includes destination information of the CDM, report data that contains a record of emergency information viewing result information described earlier with reference to FIGS. 7 to 9, such as address (URL) of the viewing information analysis apparatus 40 depicted in FIG. 4 and CDM transmission timing information.

The reception apparatus 30 acquires the destination address of the CDM, report data that contains a record of emergency information viewing result information described earlier with reference to FIGS. 7 to 9 and transmission timing information by referring to the "CDM transmission information" sent as signaling data and sends the CDM to the viewing information analysis apparatus 40 in accordance with these pieces of data.

Figure 10:
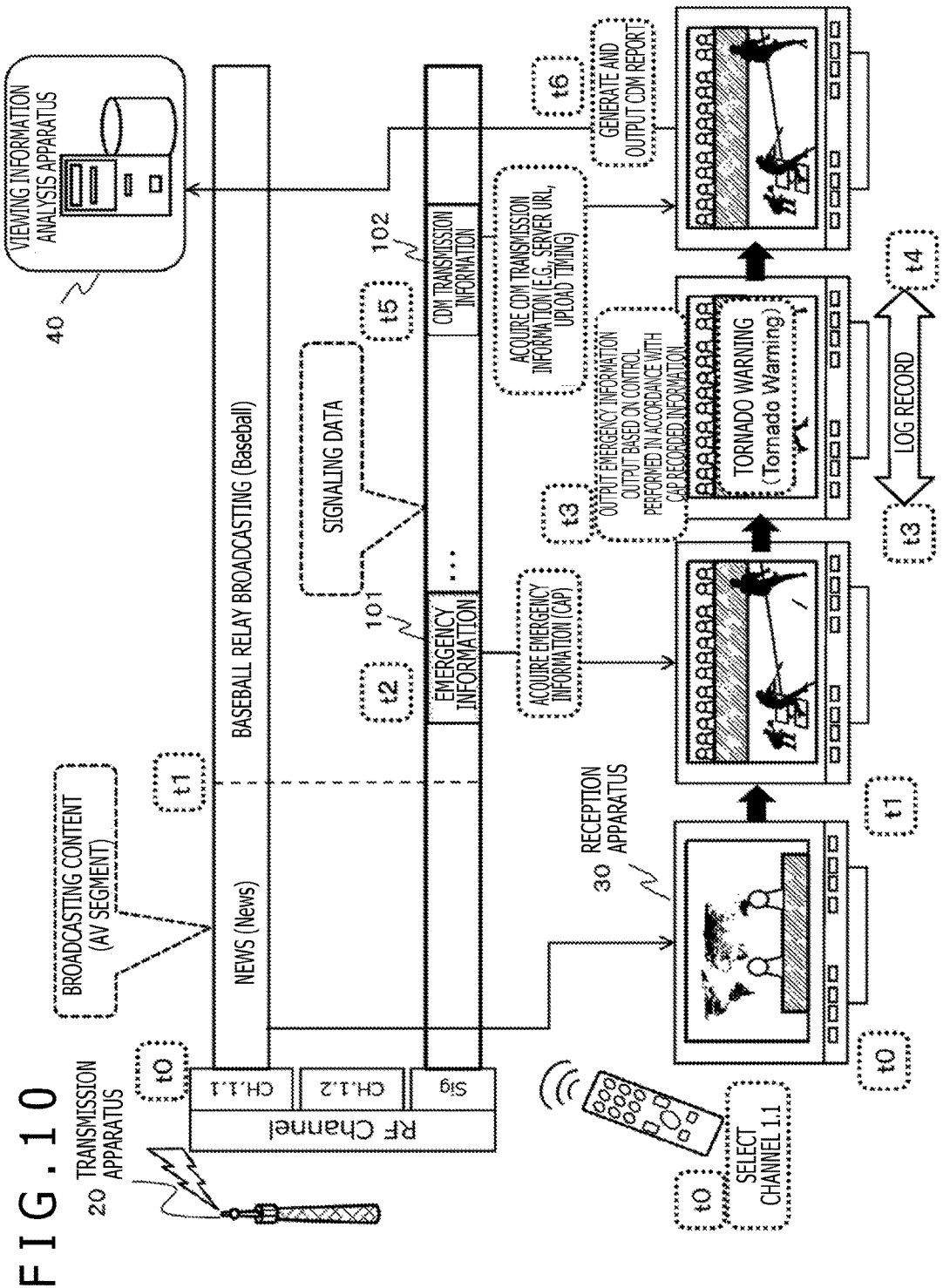
FIG. 10 is a diagram describing emergency information transmission, reception, and output processes and generation and transmission processes of a CDM including emergency information viewing result data.

FIG. 10 illustrates an example of data sent from the transmission apparatus 20 and received by the reception apparatus 30.

The transmission apparatus 20 sends broadcasting content (AV segment), program content of channel 1.1, and further sends signaling data.

The reception apparatus 30 is set up to be able to receive program content and signaling data of channel 1.1 at all times.

It should be noted that FIG. 10 illustrates processes that are performed as time elapses from time t0 to time t1, to time t2, and so on.

A description will be given below of the process performed at each time (t0, t1, t2 and so on) in sequence.

(Time t0)

First, at time t0, the user on the side of the reception apparatus 30 begins to receive program content of channel 1.1.

The transmission apparatus 20 is delivering a news program during a time period from time t0 to time t1, and the news program is displayed on the reception apparatus 30 during the time period from time t0 to time t1.

(Time t1)

At time t1, the program sent by the transmission apparatus 20 is switched to baseball.

The reception apparatus 30 continues to receive the program of channel 1.1, and baseball is displayed on the reception apparatus 30.

(Time t2)

At time t2, emergency information 101 is sent from the transmission apparatus 20 as signaling data and is received by the reception apparatus 30.

The emergency information 101 is sent from the transmission apparatus 20 as data that complies with the CAP (Common Alerting Protocol) format for transporting emergency information as described earlier. Various detailed information related to emergency information is attached to the CAP message. Attached information includes not only emergency information output on the reception apparatus but also various attribute information of emergency information such as emergency information category, emergency information urgency and sender information, and information related to regions to which emergency information needs to be notified.

(Time t3 to Time t4)

At time t3, the reception apparatus 30 analyzes the CAP message, extracts emergency information message from the CAP message, and proceeds with the message output process in accordance with information recorded in the CAP message.

As illustrated in the figure, "tornado Warning" is displayed as output on the reception apparatus 30 from time t3 to time t4.

The reception apparatus 30 records information related to the output of this emergency information as log. This log recording process is carried out in accordance with the application (program) retained in advance in the reception apparatus 30.

Specifically, for example, various information such as emergency information output start and end times, position information of the reception apparatus at the time of output of emergency information, and further output message is recorded as logs.

Log data is stored in the storage section of the reception apparatus.

(Time t5)

At time t5, CDM transmission information 102 is sent from the transmission apparatus 20 as signaling data and is received by the reception apparatus 30.

The CDM transmission information 101 includes CDM transmission information that includes destination information of the CDM, report data that contains a record of emergency information viewing result information described earlier with reference to FIGS. 7 to 9, such as address (URL) of the viewing information analysis apparatus 40 depicted in FIG. 4 and CDM transmission timing information.

Further, the reception apparatus carries out a process of creating a CDM to be sent. The CDM is executed by reading from the storage section the log data recorded from time t3 to time t4.

The CDM to be created is a CDM that includes emergency information viewing result information described earlier with reference to FIGS. 7 to 9. That is, it is a CDM that contains, for example, a record of the following emergency information viewing result data:

(1) Emergency information identifier
(2) Emergency information sender identifier
(3) Emergency information output start time
(4) Emergency information output end time
(5) Reception apparatus position information
(6) to (8) Emergency information status, type, and scope information
(9) to (13) Emergency information category, event, urgency, severity, and certainty information (Time t6)

At time t6, the reception apparatus 30 acquires the destination address of the CDM, report data that contains a record of emergency information viewing result information described earlier with reference to FIGS. 7 to 9 and transmission timing information by referring to the received CDM transmission information and sends the CDM to the viewing information analysis apparatus 40 in accordance with these pieces of data.

The CDM sent by the reception apparatus 30 is a CDM that includes emergency information viewing result information described earlier with reference to FIGS. 7 to 9. That is, it is, for example, a CDM that contains a record of the following emergency information viewing result information:

(1) Emergency information identifier
(2) Emergency information sender identifier
(3) Emergency information output start time
(4) Emergency information output end time
(5) Reception apparatus position information
(6) to (8) Emergency information status, type, and scope information
(9) to (13) Emergency information category, event, urgency, severity, and certainty information The viewing information analysis apparatus 40 analyzes the CDMs sent from a number of reception apparatuses, making it possible to analyze the emergency information reception and output status on each of the reception apparatuses.

It should be noted that although the processes of creating and sending a CDM that contains a record of emergency information viewing result data were described as examples of processes carried out during an emergency information delivery test, it is possible to carry out the processes of creating and sending a CDM that contains a record of emergency information viewing result data not only during a test but also during an actual emergency information delivery process.

4. Processing Sequence Handled by the Reception Apparatus that Receives and Outputs Emergency Information A description will be given next of a processing sequence carried out by the reception apparatus, a user apparatus such as TV that receives and outputs emergency information, in accordance with the flowchart depicted in FIG. 11.

Figure 11:
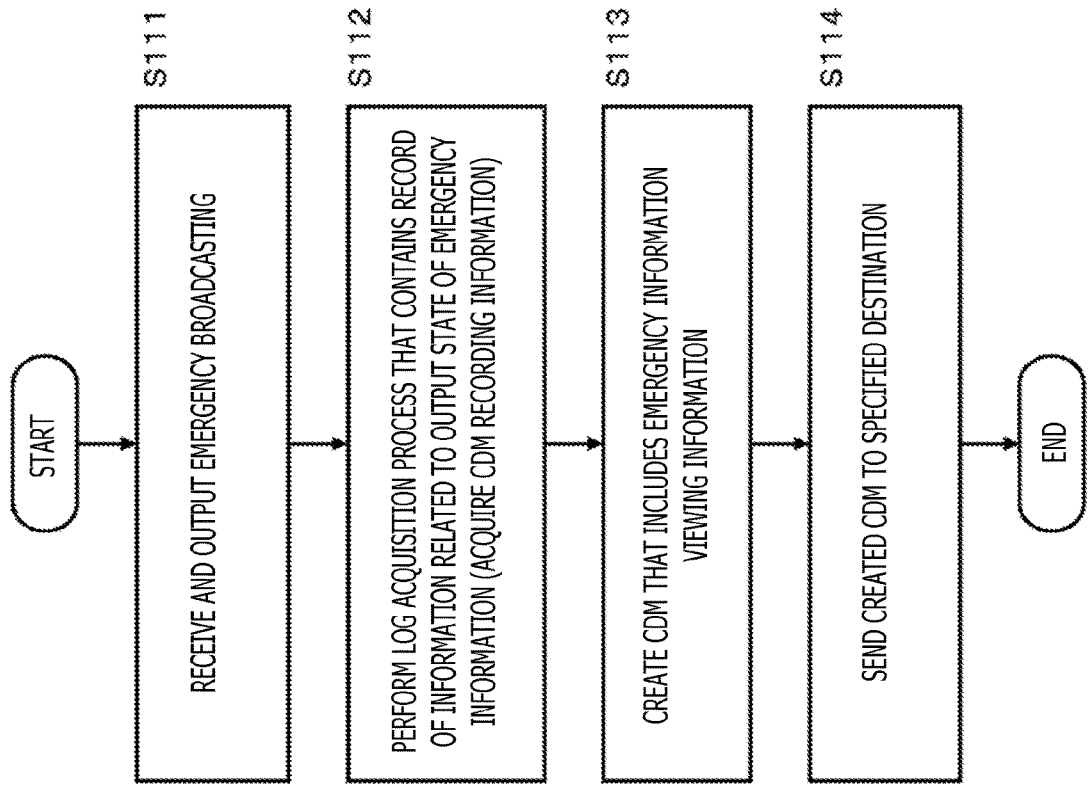
FIG. 11 is a diagram illustrating a flowchart describing a processing sequence in a reception apparatus that receives and outputs emergency information.

It should be noted that the reception apparatus that carries out processes that are comply with the flowchart depicted in FIG. 11 is, for example, the reception apparatus 30 depicted in FIG. 4 and is, for example, a user apparatus such as TV.

The reception apparatus 30 has, for example, stored in the storage section, a program for performing the processes that comply with the flowchart depicted in FIG. 11 and executes the program, for example, in the data processing section that includes a CPU having a program execution function.

A description will be given below of the process in each step of the flow depicted in FIG. 11.

(Step S111)

First, in step S111, the reception apparatus receives emergency broadcasting and outputs the received emergency information to the reception apparatus.

As described earlier, emergency information is sent from the transmission apparatus as data (CAP message) that complies with the CAP (Common Alerting Protocol) format for transporting emergency information. Various detailed information related to emergency information is attached to the CAP message. Attached information includes not only emergency information output on the reception apparatus but also various attribute information of emergency information such as emergency information category, emergency information urgency and sender information, and information related to regions to which emergency information needs to be notified.

In step S111, the reception apparatus analyzes the received CAP message, extracts emergency information message from the CAP message, and proceeds with the message output process in accordance with information recorded in the CAP message.

(Step S112)

Next, in step S112, the reception apparatus performs a log acquisition process of recording information related to the emergency information output status. Specifically, the reception apparatus performs, for example, a process of acquiring data to be recorded to the CDM that includes emergency information viewing result data described earlier with reference to FIGS. 7 to 9.

(Step S113)

Next, in step S113, the reception apparatus creates a CDM that includes emergency information viewing information.

The CDM created by the reception apparatus is a CDM that includes emergency information viewing result information described earlier with reference to FIGS. 7 to 9. That is, it is a CDM that contains, for example, a record of the following emergency information viewing result data:

(1) Emergency information identifier
(2) Emergency information sender identifier
(3) Emergency information output start time
(4) Emergency information output end time
(5) Reception apparatus position information
(6) to (8) Emergency information status, type, and scope information
(9) to (13) Emergency information category, event, urgency, severity, and certainty information (Step S114)

Next, in step S114, the reception apparatus sends the created CDM to the specified destination.

It should be noted that, as described earlier with reference to FIG. 10, CDM destination information and transmission timing information is recorded in the CDM transmission information that is sent separately from the transmission apparatus.

The reception apparatus receives CDM transmission information, acquires the CDM destination and the transmission timing in accordance with the data recorded in the received CDM transmission information, and performs a CDM transmission process of sending the CDM to the specified destination.

5. Processes of Receiving and Analyzing the CDM Sent from the Reception Apparatus Performed by the Viewing Information Analysis Apparatus A description will be given next of the processes of receiving and analyzing the CDM sent from the reception apparatus performed by the viewing information analysis apparatus in accordance with the flow described with reference to FIG. 11.

Figure 12:
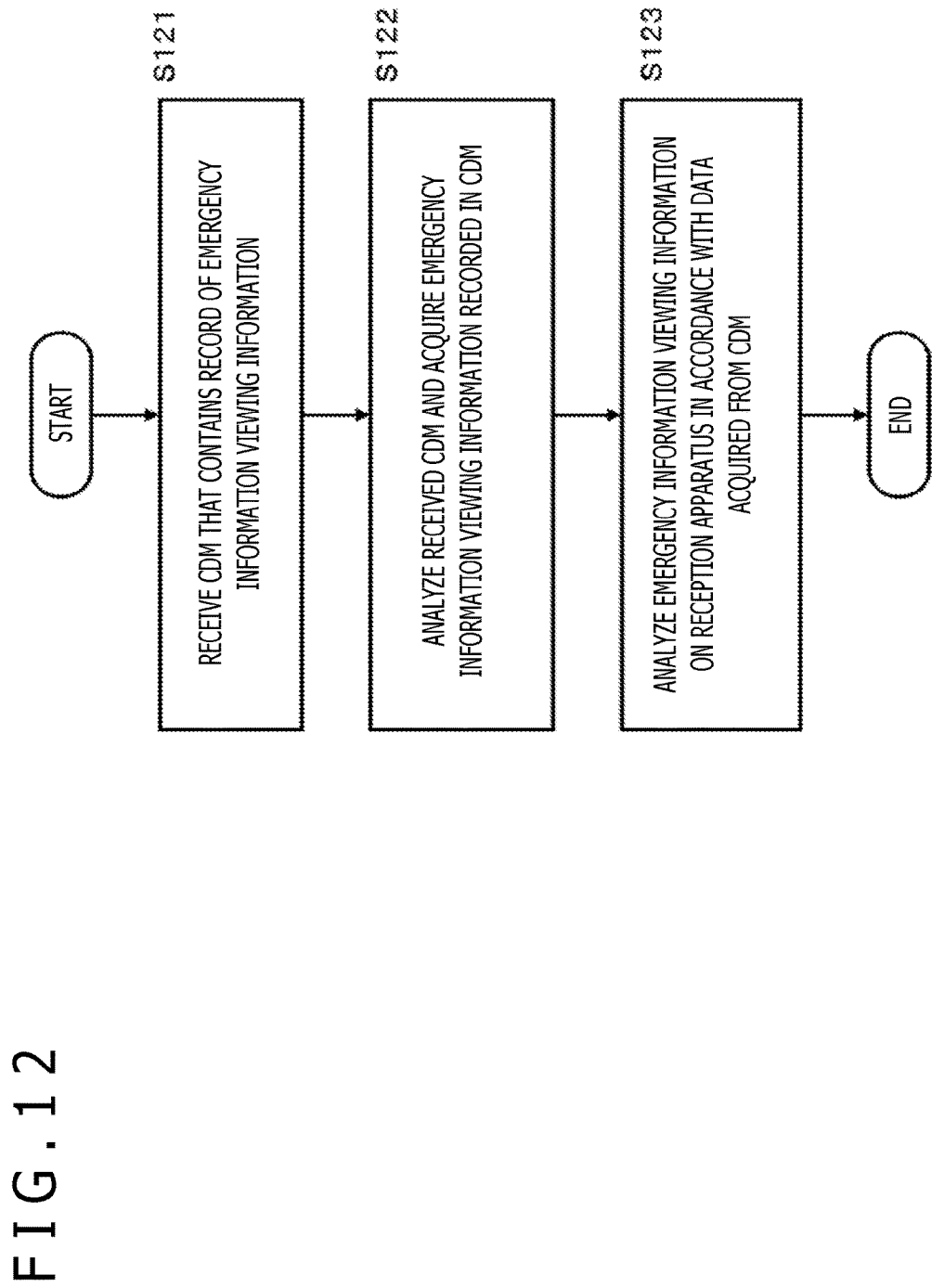
FIG. 12 is a diagram illustrating a flowchart that describes a processing sequence of a viewing information analysis apparatus that receives and analyzes the CDM created by the reception apparatus that receives and outputs emergency information.

The viewing information analysis apparatus that carries out the processes that comply with the flowchart depicted in FIG. 12 is, for example, the viewing information analysis apparatus 40 depicted in FIG. 4.

The viewing information analysis apparatus 40 has, stored in the storage section, a program for carrying out the processes that comply with the flowchart depicted in FIG. 12 and executes the program, for example, in the data processing section that includes a CPU having a program execution function.

A description will be given below of the process in each step of the flow depicted in FIG. 12.

(Step S121)

First, in step S121, the viewing information analysis apparatus receives a CDM that contains a record of emergency information viewing information from the reception apparatus.

It should be noted that the CDM received from the reception apparatus is a CDM that includes emergency information viewing result information described earlier with reference to FIGS. 7 to 9. That is, it is a CDM that contains, for example, a record of the following emergency information viewing result data:

(1) Emergency information identifier
(2) Emergency information sender identifier
(3) Emergency information output start time
(4) Emergency information output end time
(5) Reception apparatus position information
(6) to (8) Emergency information status, type, and scope information
(9) to (13) Emergency information category, event, urgency, severity, and certainty information (Step S122)

Next, in step S122, the viewing information analysis apparatus analyzes the CDM received from the reception apparatus and acquires emergency information viewing information recorded in the CDM.

That is, the viewing information analysis apparatus acquires emergency information viewing result information described earlier with reference to FIGS. 7 to 9.

(Step S123)

Next, in step S123, the viewing information analysis apparatus analyzes the emergency information viewing information of the reception apparatus in accordance with the data acquired from the CDM.

The viewing information analysis apparatus analyzes the CDMs sent from a number of reception apparatuses and analyzes each piece of information related to emergency information viewed on each of the reception apparatuses such as each of the following pieces of information described earlier with reference to FIGS. 7 to 9:

(1) Emergency information identifier
(2) Emergency information sender identifier
(3) Emergency information output start time
(4) Emergency information output end time
(5) Reception apparatus position information (6) to (8) Emergency information status, type, and scope information (9) to (13) Emergency information category, event, urgency, severity, and certainty information Analyzing these pieces of data makes it possible to acquire various emergency information viewing status data such as time when emergency information was actually displayed on each reception apparatus and emergency information viewing status in each region.

6. Configuration Examples of the Transmission Apparatus, the Reception Apparatus, and the Viewing Information Analysis Apparatus A description will be given next of configuration examples of the transmission apparatus 20, the reception apparatus 30, and the viewing information analysis apparatus 40 with reference to FIGS. 13 and 14.

Figure 13:
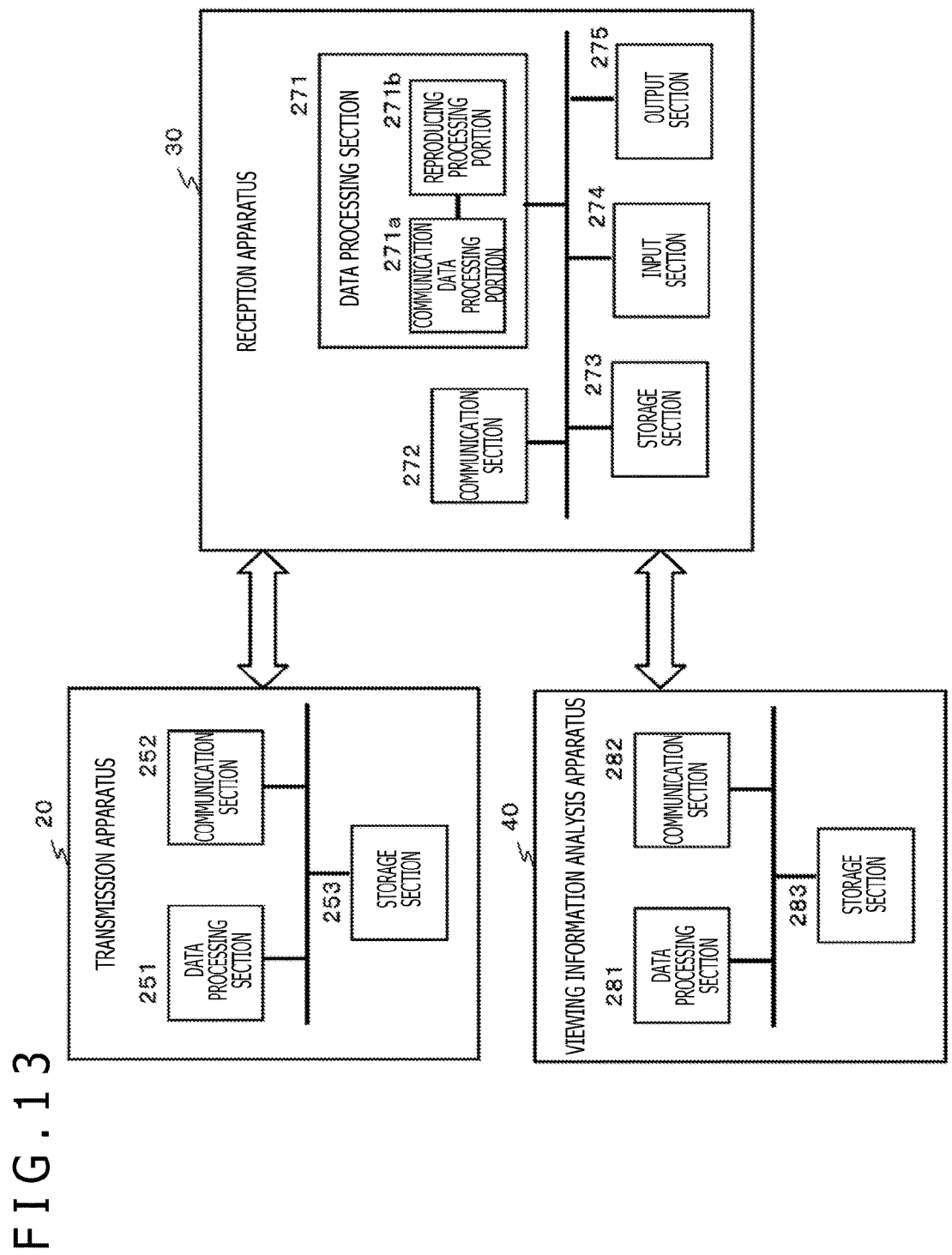
FIG. 13 is a diagram describing configuration examples of the transmission apparatus, the reception apparatus, and the viewing information analysis apparatus.

FIG. 13 illustrates configuration examples of the transmission apparatus 20, the reception apparatus 30, and the viewing information analysis apparatus 40.

The transmission apparatus 20 includes a data processing section 251, a communication section 252, and a storage section 253.

The reception apparatus 30 includes a data processing section 271, a communication section 272, a storage section 273, an input section 274, and an output section 275.

The data processing section includes a communication data processing portion 271*a* and a reproducing processing portion 271*b*.

The viewing information analysis apparatus 40 includes a data processing section 281, a communication section 282, and a storage section 283.

The data processing section 251 of the transmission apparatus 20 performs a variety of data processing tasks to carry out data delivery services. For example, the data processing section 251 creates configuration data of data delivery services and controls data transmission. Further, the data processing section 251 creates and sends content, applications, various other data, and signaling data provided to the reception apparatus 30.

It should be noted that signaling data includes, for example, emergency information and CDM transmission information for creating and sending a CDM.

The communication section 252 handles communication processes such as delivery of not only AV segments but also applications and various other data and signaling data.

The storage section 253 stores AV segments, applications, data used by applications, and signaling data, and so on as delivering target.

Further, the storage section 253 is used as a work area for data processing handled by the data processing section 251 and used also as a storage area of various kinds of parameters.

On the other hand, the reception apparatus 30 includes the data processing section 271, the communication section 272, the storage section 273, the input section 274, and the output section 275.

The communication section 272 receives data delivered from the transmission apparatus 20 such as AV segments, applications, and signaling data.

It should be noted that signaling data includes, for example, emergency information and CDM transmission information for creating and sending a CDM.

The data processing section 271 includes a communication data processing portion 271*a* and a reproducing processing portion 271*b* and handles, for example, the processes that comply with the embodiment described earlier.

Specifically, the data processing section 271 handles the CDM creation and transmission processes.

For example, the data processing section 271 creates a CDM that includes emergency information viewing result data described earlier and sends the CDM to the viewing information analysis apparatus.

Various user instruction commands such as channel selection, application startup, and installation are input via the input section 274.

Reproducing data is output on the output section 275 such as display section and speaker.

The storage section 273 stores AV segments, applications, data used by applications, and signaling data, and so on.

Further, the storage section 273 is used as a work area for data processing handled by the data processing section 271 and used also as a storage area of various kinds of parameters.

The data processing section 281 of the viewing information analysis apparatus 40 handles various kinds of data processing tasks such as viewing information analysis process. For example, the data processing section 281 performs a process of analyzing the CDM that includes emergency information viewing result data received from the reception apparatus 30 and so on.

The communication section 282 performs a communication process of exchanging communication data with the reception apparatus 30.

The storage section 283 stores CDM analysis results and so on. Further, the storage section 283 stores information related to the reception apparatus, applications or programs for performing the CDM analysis process, and so on.

Still further, the storage section 283 is used as a work area for data processing handled by the data processing section 281 and used also as a storage area of various kinds of parameters.

It should be noted that although the processes of creating, sending, and analyzing a CDM that contains a record of emergency information viewing result data were described as examples of processes carried out during an emergency information delivery test, it is possible to carry out the processes of creating, sending, and analyzing a CDM that contains a record of emergency information viewing result data not only during a test but also during an actual emergency information delivery process.

Figure 14:
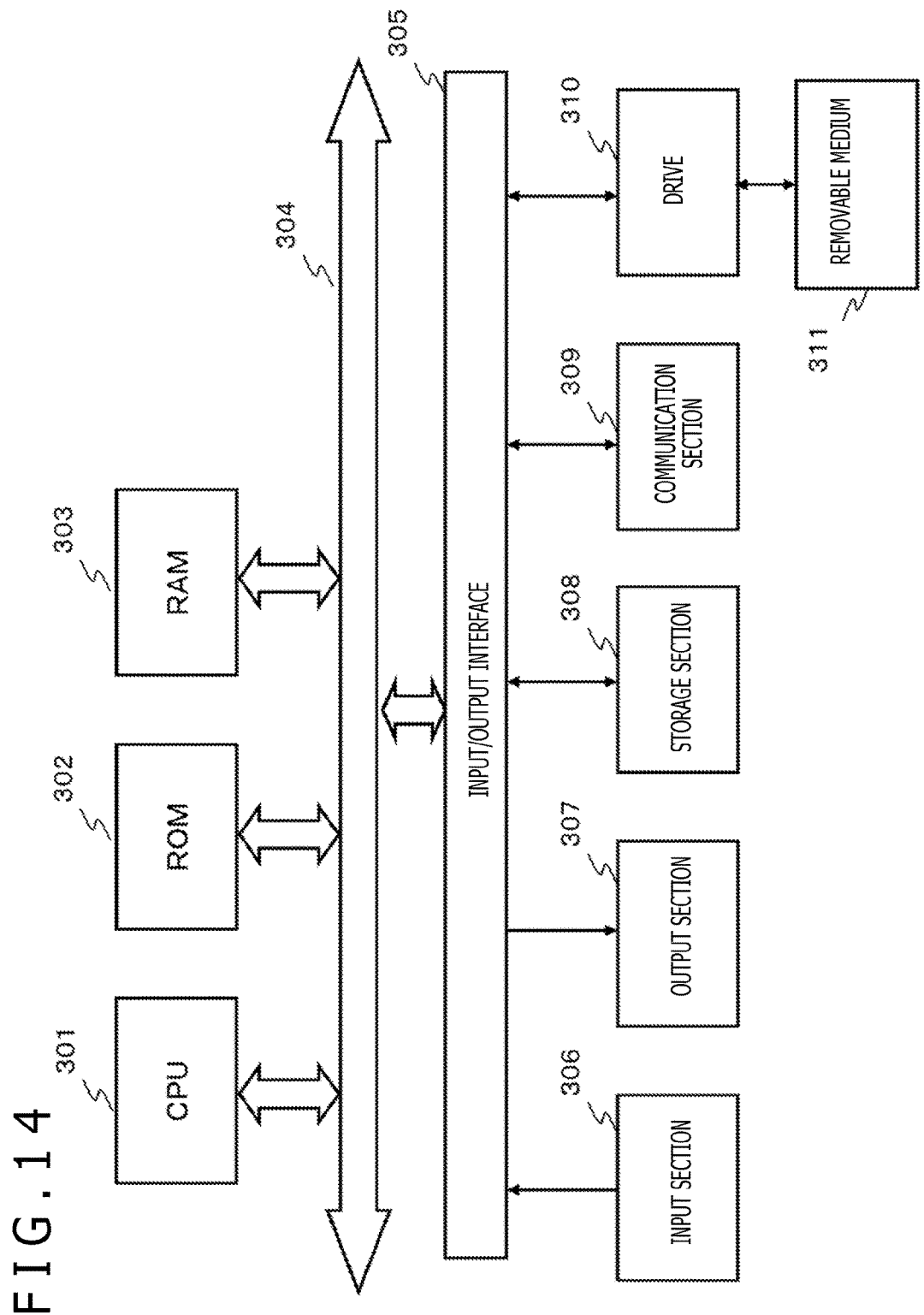
FIG. 14 is a diagram describing hardware configuration examples of the transmission apparatus, the reception apparatus, and the viewing information analysis apparatus.

FIG. 14 illustrates hardware configuration examples of the applicable communication apparatus as the transmission apparatus 20, the reception apparatus 30, and the viewing information analysis apparatus 40.

A CPU (Central Processing Unit) 301 functions as a data processing section that performs various processes in accordance with programs stored in a ROM (Read Only Memory) 302 or a storage section 308. For example, the CPU 301 performs processes in accordance with the sequence described in the above embodiment. A RAM (Random Access Memory) 303 stores programs to be executed by the CPU 301 and data. The CPU 301, the ROM 302, and the RAM 303 are connected to each other by a bus 304.

The CPU 301 is connected to an input/output (I/O) interface 305 via the bus 304, and an input section 306 and an output section 307 are connected to the I/O interface 305. The input section 306 includes various switches, a keyboard, a mouse, a microphone, and so on. The output section 307 includes a display, a speaker, and so on. The CPU 301 performs various processes in accordance with an instruction input from the input section 306 and outputs processing results, for example, to the output section 307.

The storage section 308 connected to the I/O interface 305 includes, for example, a hard disk and stores programs to be executed by the CPU 301 and various data. A communication section 309 functions as a transmission/reception section for communicating data via the Internet, local area networks, and other networks, and further as a broadcasting wave transmission/reception section to communicate with external apparatuses.

A drive 310 connected to the I/O interface 305 drives a removable medium 311 such as magnetic disk, optical disc, magneto-optical disk, or memory card and other semiconductor memory and drives the removable medium 311 to record or read data.

7. Conclusion of the Configuration of the Present Disclosure

Thus, an embodiment of the present disclosure has been described in detail with reference to a specific embodiment. However, it is self-evident that a person skilled in the art can conceive of modifying or substituting the embodiment fall within the gist of the present disclosure. That is, the present invention has been disclosed as illustration and should not be interpreted restrictively. The Claim section should be taken into consideration to judge the gist of the present disclosure.

It should be noted that the technology disclosed in the present specification can have the following configurations:

(1) A communication apparatus for receiving and outputting emergency information, the communication apparatus including:

a data processing section adapted to generate an emergency information viewing result report that contains a record of emergency information viewing result information; and a communication section adapted to send the generated emergency information viewing result report, in which the data processing section generates an emergency information viewing result report that contains a record of an identifier of the emergency information output on the communication apparatus and output time information of the emergency information.

(2) The communication apparatus of feature (1), in which the data processing section generates the emergency information viewing result report in accordance with a CDM (Consumption Data Message) format.

(3) The communication apparatus of feature (1) or (2), in which the data processing section generates an emergency information viewing result report that contains a record of output start time and output end time of the emergency information on the communication apparatus.

(4) The communication apparatus of any one of features (1) to (3), in which the data processing section generates an emergency information viewing result report that contains a record of sender information of the emergency information output on the communication apparatus.

(5) The communication apparatus of any one of features (1) to (4), in which the data processing section generates an emergency information viewing result report that contains a record of position information of the communication apparatus at a time of output of the emergency information on the communication apparatus.

(6) The communication apparatus of any one of features (1) to (5), in which the data processing section generates an emergency information viewing result report that contains a record of at least one of the following pieces of information (a) to (d):

(a) Type information of the emergency information output on the communication apparatus (b) Event information including message data of the emergency information output on the communication apparatus (c) Severity information of the emergency information output on the communication apparatus (d) Urgency information of the emergency information output on the communication apparatus (7) The communication apparatus of any one of features (1) to (6), in which the data processing section receives not only emergency information to be output but also a CAP message that complies with a CAP (Common Alerting Protocol) format that includes attribute information related to the emergency information and performs an emergency information output process in accordance with analysis results of the CAP message.

(8) The communication apparatus of feature (7), in which the data processing section generates the emergency information viewing result report by using information recorded in the CAP message.

(9) The communication apparatus of any one of features (1) to (8), in which the data processing section receives not only emergency information to be output but also an emergency information output application that includes an output control program of the emergency information and performs an emergency information output process by executing the emergency information output application.

(10) The communication apparatus of feature (9), in which the emergency information output application includes a program that generates the emergency information viewing result report or a program for acquiring data necessary to generate the emergency information viewing result report.

(11) The communication apparatus of any one of features (1) to (10), in which the data processing section receives emergency information viewing result report transmission information sent as signaling data, acquires a destination address of the emergency information viewing result report and transmission timing information by referring to the received emergency information viewing result report transmission information, and performs a process of sending the emergency information viewing result report in accordance with the acquired information.

(12) A communication apparatus including:

a communication section adapted to receive an emergency information viewing result report sent by an emergency information reception apparatus; and a data processing section adapted to perform a process of analyzing the emergency information viewing result report.

(13) The communication apparatus of feature (12), in which the emergency information viewing result report is data that complies with a CDM (Consumption Data Message) format.

(14) The communication apparatus of feature (12) or (13), in which the emergency information viewing result report is an emergency information viewing result report that contains a record of output start time and output end time of the emergency information on the emergency information reception apparatus.

(15) The communication apparatus of any one of features (12) to (14), in which the emergency information viewing result report is an emergency information viewing result report that contains a record of at least one of the following pieces of information (a) to (f):

(a) Sender information of the emergency information output on the emergency information reception apparatus (b) Position information of the communication apparatus at a time of output of the emergency information on the emergency information reception apparatus (c) Type information of the emergency information output on the emergency information reception apparatus (d) Event information including message data of the emergency information output on the emergency information reception apparatus (e) Severity information of the emergency information output on the emergency information reception apparatus (f) Urgency information of the emergency information output on the emergency information reception apparatus.

(16) The communication apparatus of any one of features (12) to (15), in which the emergency information viewing result report includes data recorded in CAP (Common Alerting Protocol) format data, emergency information communication format data received by the emergency information reception apparatus.

(17) A communication apparatus including:

a data processing section adapted to generate an emergency information output application; and a communication section adapted to send the emergency information output application to a reception apparatus, in which the emergency information output application is an application that includes not only emergency information output on the reception apparatus but also an output control program of the emergency information and a program that generates an emergency information viewing result report on the reception apparatus.

(18) A data processing method carried out by a communication apparatus that receives and outputs emergency information, in which a data processing section generates an emergency information viewing result report that contains a record of emergency information viewing result information, a communication section performs a process of sending the generated emergency information viewing result report, and the data processing section generates an emergency information viewing result report that contains a record of an identifier of the emergency information output by the communication apparatus and emergency information output time information.

(19) A data processing method carried out by a communicating apparatus that receives an emergency information viewing result report from an emergency information reception apparatus, in which a communication section receives an emergency information viewing result report sent by the emergency information reception apparatus, and a data processing section performs a process of analyzing the emergency information viewing result report.

(20) A data processing method carried out by a communication apparatus that performs a process of sending emergency information, in which a data processing section generates an emergency information output application, a communication section performs a process of sending the emergency information output application to a reception apparatus, and the emergency information output application is an application that includes not only emergency information output on the reception apparatus but also an output control program of the emergency information and a program that generates an emergency information viewing result report on the reception apparatus.

Further, the series of processes described in the specification can be performed by hardware, software, or a combination thereof. In a case where the series of processes are performed by software, a program having a processing sequence recorded therein can be executed by installing the program to a memory of a computer built into dedicated hardware. Alternatively, the program can be executed by installing it to a general-purpose computer capable of performing various processing tasks. For example, the program can be recorded in advance in a recording medium. The program can be not only installed from the recording medium to the computer but also received via a network such as LAN (Local Area Network) and the Internet and installed to a built-in recording medium such as hard disk.

It should be noted that various processes described in the specification may be performed not only chronologically in accordance with the description but also in parallel or individually according to the processing capability of the apparatus that performs the processes or as necessary. On the other hand, the system in the present specification refers to a configuration of a logical set of a plurality of apparatuses and is not limited to apparatuses having respective configurations that are provided in the same housing.

INDUSTRIAL APPLICABILITY

As described above, according to an embodiment of the present disclosure, a configuration is realized that permits confirmation of emergency information viewing results on a reception apparatus, an endpoint of emergency information such as TV.

Specifically, a data processing section of a reception apparatus such as TV that receives and outputs emergency information generates an emergency information viewing result report that contains a record of emergency information viewing result information and sends the generated emergency information viewing result report to a management server and so on. The data processing section generates an emergency information viewing result report that contains a record of an identifier of emergency information output by the reception apparatus and emergency information output time information in accordance with a CDM (Consumption Data Message) format. The CDM keeps a record of not only emergency information output time information but also reception apparatus position information, emergency information sender information, and so on.

The present configuration realizes a configuration that permits confirmation of emergency information viewing results on a reception apparatus, an endpoint of emergency information such as TV.

REFERENCE SIGNS LIST

11 Federal organization level communication apparatus
12 State level communication apparatus
13 Local level communication apparatus
14 Broadcasting station
15 Reception apparatus 16 Viewer
20 Transmission apparatus
21 Broadcasting server
30 Reception apparatus
31 TV
32 PC
33 Mobile terminal
40 Viewing information analysis apparatus
41 Viewing information analysis server
101 Emergency information
102 CDM transmission information
251 Data processing section
252 Communication section
253 Storage section
271 Data processing section
272 Communication section
273 Storage section
274 Input section
275 Output section
281 Data processing section
282 Communication section
283 Storage section
301 CPU
302 ROM
303 RAM
304 Bus
305 I/O interface
306 Input section
307 Output section
308 Storage section
309 Communication section
310 Drive
311 Removable medium

The invention claimed is:

1. A communication apparatus for receiving and outputting emergency information, the communication apparatus comprising:
   circuitry configured to:
   generate an emergency information viewing result report that contains a record of emergency information viewing result information; and
   send the generated emergency information viewing result report, wherein
   the emergency information viewing result report contains a record of:
     an identifier of the emergency information output on the communication apparatus, and
     time information representing a time in which at least one of a display and a speaker of the communication apparatus output the emergency information.

2. The communication apparatus of claim 1, wherein the circuitry is configured to generate the emergency information viewing result report in accordance with a CDM (Consumption Data Message) format.

3. The communication apparatus of claim 1, wherein the time information includes an output start time and an output end time of the output of the emergency information on the communication apparatus.

4. The communication apparatus of claim 1, wherein the emergency information viewing result report contains a record of sender information of the emergency information output on the communication apparatus.

5. The communication apparatus of claim 1, wherein the emergency information viewing result report contains a record of position information of the communication apparatus at a time of the output of the emergency information on the communication apparatus.

6. The communication apparatus of claim 1, wherein the emergency information viewing result report contains a record of at least one of the following pieces of information (a) to (d):
   (a) Type information of the emergency information output on the communication apparatus,
   (b) Event information including message data of the emergency information output on the communication apparatus,
   (c) Severity information of the emergency information output on the communication apparatus, and
   (d) Urgency information of the emergency information output on the communication apparatus.

7. The communication apparatus of claim 1, wherein the circuitry is configured to:
   receive the emergency information to be output,
   receive a CAP message that complies with a CAP (Common Alerting Protocol) format and includes attribute information related to the emergency information, and
   perform an emergency information output process in accordance with analysis of the CAP message to output the emergency information on the communication apparatus.

8. The communication apparatus of claim 7, wherein the circuitry is configured to generate the emergency information viewing result report by using information recorded in the CAP message.

9. The communication apparatus of claim 1, wherein the circuitry is configured to:
   receive the emergency information to be output,
   receive an emergency information output application that includes an output control program of the emergency information, and
   perform an emergency information output process to output the emergency information on the communication apparatus by executing the emergency information output application.

10. The communication apparatus of claim 9, wherein the emergency information output application includes a program that generates the emergency information viewing result report or a program for acquiring data necessary to generate the emergency information viewing result report.

11. The communication apparatus of claim 1, wherein the circuitry is configured to:
   receive emergency information viewing result report transmission information sent as signaling data,
   acquire a destination address of the emergency information viewing result report and transmission timing information by referring to the received emergency information viewing result report transmission information, and
   perform a process of sending the emergency information viewing result report in accordance with the destination address and the transmission timing information.

12. A communication apparatus comprising:
   circuitry configured to:
   receive an emergency information viewing result report sent by an emergency information reception apparatus; and
   perform a process of analyzing the emergency information viewing result report, wherein
   the emergency information viewing result report contains a record of:
     an identifier of emergency information output on the emergency information reception apparatus, and time information representing a time in which at least one of a display and a speaker of the emergency information reception apparatus output the emergency information.

13. The communication apparatus of claim 12, wherein the emergency information viewing result report is data that complies with a CDM (Consumption Data Message) format.

14. The communication apparatus of claim 12, wherein the time information includes an output start time and an output end time of the output of the emergency information on the emergency information reception apparatus.

15. The communication apparatus of claim 12, wherein the emergency information viewing result contains a record of at least one of the following pieces of information (a) to (f):
   (a) Sender information of the emergency information output on the emergency information reception apparatus,
   (b) Position information of the emergency information reception apparatus at a time of the output of the emergency information on the emergency information reception apparatus,
   (c) Type information of the emergency information output on the emergency information reception apparatus,
   (d) Event information including message data of the emergency information output on the emergency information reception apparatus,
   (e) Severity information of the emergency information output on the emergency information reception apparatus, and
   (f) Urgency information of the emergency information output on the emergency information reception apparatus.

16. The communication apparatus of claim 12, wherein the emergency information viewing result report includes data recorded in a CAP (Common Alerting Protocol) format data, which is an emergency information communication format data received by the emergency information reception apparatus.

17. A communication apparatus comprising:
   circuitry configured to:
   generate an emergency information output application; and
   send the emergency information output application to a reception apparatus, wherein
   the emergency information output application includes:
      emergency information for output on the reception apparatus,
      an output control program of the emergency information, and
      a program that generates an emergency information viewing result report on the reception apparatus.

18. A data processing method carried out by a communication apparatus that receives and outputs emergency information, comprising:
   generating an emergency information viewing result report that contains a record of emergency information viewing result information, and
   sending the generated emergency information viewing result report, wherein
   the emergency information viewing result report that contains a record of:
      an identifier of the emergency information output by the communication apparatus, and
      time information representing a time in which at least one of a display and a speaker of the communication apparatus output the emergency information.

19. A data processing method carried out by a communication apparatus that receives an emergency information viewing result report from an emergency information reception apparatus, comprising:
   receiving the emergency information viewing result report sent by the emergency information reception apparatus, and
   performing a process of analyzing the emergency information viewing result report, wherein
   the emergency information viewing result report contains a record of:
      an identifier of emergency information output on the emergency information reception apparatus, and
      time information representing a time in which at least one of a display and a speaker of the emergency information reception apparatus output the emergency information.

20. A data processing method carried out by a communication apparatus that performs a process of sending emergency information, comprising:
   generating an emergency information output application,
   sending the emergency information output application to a reception apparatus, wherein
   the emergency information output application includes:
      the emergency information for output on the reception apparatus,
      an output control program of the emergency information, and
      a program that generates an emergency information viewing result report on the reception apparatus.

* * * * *